United States Patent
Ramasubramonian et al.

(10) Patent No.: US 11,159,805 B2
(45) Date of Patent: *Oct. 26, 2021

(54) METHODS AND SYSTEMS FOR GENERATING REGIONAL NESTING MESSAGES FOR VIDEO PICTURES

(71) Applicant: QUALCOMM Incorporated, San Diego, CA (US)

(72) Inventors: Adarsh Krishnan Ramasubramonian, Irvine, CA (US); Joel Sole Rojals, San Diego, CA (US); Ye-Kui Wang, San Diego, CA (US); Dmytro Rusanovskyy, San Diego, CA (US); Done Bugdayci Sansli, Tampere (FI); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,825

(22) Filed: Dec. 20, 2019

(65) Prior Publication Data

US 2020/0204809 A1    Jun. 25, 2020

Related U.S. Application Data

(63) Continuation of application No. 15/588,516, filed on May 5, 2017, now Pat. No. 10,554,981.
(Continued)

(51) Int. Cl.
*H04N 19/167* (2014.01)
*H04N 19/172* (2014.01)
(Continued)

(52) U.S. Cl.
CPC ......... *H04N 19/167* (2014.11); *H04N 19/172* (2014.11); *H04N 19/70* (2014.11); *H04N 19/80* (2014.11); *H04N 19/85* (2014.11)

(58) Field of Classification Search
None
See application file for complete search history.

(56) References Cited

U.S. PATENT DOCUMENTS

| 9,521,393 | B2 | 12/2016 | Wang et al. |
| 10,554,981 | B2 | 2/2020 | Ramasubramonian et al. |

(Continued)

FOREIGN PATENT DOCUMENTS

| CN | 104604236 A | 5/2015 |
| CN | 105981387 A | 9/2016 |

(Continued)

OTHER PUBLICATIONS

Hannuksela M.M., et al., "Scope of Supplemental Enhancement Information Messages," 20. JVT Meeting, 77. MPEG Meeting, Jul. 15, 2006-Jul. 21, 2006; Klagenfurt, Austria, (Joint Video Team of ISO/IEC (MPEG & ITU-T VCEG) JTC1/SC29/WG11 and ITU-TSG.16 Q6) No. JVT-T073, Jul. 12, 2006 (Jul. 12, 2006), XP030006560; 6 pages, ISSN: 0000-0408, Section 3.

(Continued)

*Primary Examiner* — Chikaodili E Anyikire
(74) *Attorney, Agent, or Firm* — Qualcomm Incorporated

(57) ABSTRACT

Systems, methods, and computer readable media are described for generating a regional nesting message. In some examples, a video bitstream is obtained and an encoded video bitstream is generated using the video data. The encoded video bitstream includes a regional nesting message that contains a plurality of nested messages and a plurality of region data defining a plurality of regions of a picture of the encoded video bitstream. For example, a first nested (Continued)

message of the regional nesting message includes a first set of data and a first region identifier indicating that the first set of data is to be applied to a first region of the plurality of regions of the picture.

31 Claims, 9 Drawing Sheets

Related U.S. Application Data

(60) Provisional application No. 62/405,161, filed on Oct. 6, 2016, provisional application No. 62/336,435, filed on May 13, 2016, provisional application No. 62/334,354, filed on May 10, 2016.

(51) Int. Cl.
*H04N 19/70* (2014.01)
*H04N 19/80* (2014.01)
*H04N 19/85* (2014.01)

(56) References Cited

U.S. PATENT DOCUMENTS

| | | | | |
|---|---|---|---|---|
| 2010/0142613 A1* | 6/2010 | Zhu | ............ | H04N 21/2383 |
| | | | | 375/240.02 |
| 2010/0215347 A1* | 8/2010 | Ikeda | ............ | G11B 27/322 |
| | | | | 386/212 |
| 2011/0115884 A1* | 5/2011 | Uchimura | ............ | G11B 27/034 |
| | | | | 348/46 |
| 2011/0194844 A1* | 8/2011 | Uchimura | ............ | H04N 5/85 |
| | | | | 386/328 |
| 2012/0213492 A1* | 8/2012 | Takeuchi | ............ | H04N 21/4312 |
| | | | | 386/244 |
| 2013/0235152 A1* | 9/2013 | Hannuksela | ............ | H04N 19/597 |
| | | | | 348/43 |
| 2017/0251189 A1* | 8/2017 | Tsukagoshi | ............ | H04N 5/20 |

FOREIGN PATENT DOCUMENTS

| | | |
|---|---|---|
| JP | 2009510888 A | 3/2009 |
| JP | 2010531554 A | 9/2010 |
| WO | WO-2013030458 A1 | 3/2013 |
| WO | WO-2014107396 A1 | 7/2014 |
| WO | WO-2015056179 A1 | 4/2015 |
| WO | WO-2015056182 A2 | 4/2015 |
| WO | WO-2015148545 A1 | 10/2015 |
| WO | WO-2015195888 A1 | 12/2015 |

OTHER PUBLICATIONS

International Search Report and Written Opinion—PCT/US2017/031558—ISA/EPO—dated Jul. 13, 2017.
Karczewicz M, et al., "Post-Filter Hint SEI Message Extensions" 35. VCEG Meeting; 85. MPEG Meeting; Jul. 16, 2008-Jul. 18, 2008; Berlin; (Video Coding 'Experts Group of ITU-T SG.16), Jul. 12, 2008 (Jul. 12, 2008), pp. 1-3, XP030003599.
Ramasubramonian A.K., et al., "Regional Nesting SEI Message," 24th JCT-VC Meeting, Joint Collaborative Team On Video Coding of ISO/IEC JTC1/SC29/WG11 and ITU-T Sg 16, URL: HTTP://WFTP3.ITU.INT/AV-ARCH/JCTVC-SITE/,.no. JCTVC-X0062-v2, May 29, 2016, XP030117998, DOC:JCTVC-X0062, 7 pages.
Ramasubramonian A.K., et al., "Regional Nesting SEI Message," 25th JCT-VC Meeting, Joint Collaborative Team On Video Coding of ISO/IEC JTC1/SC29/WG11 and ITU-T SG 16, URL: HTTP://WFTP3.ITU.INT/AV-ARCH/JCTVC-SITE/,,no. JCTVC-Y0035, Oct. 6, 2016, XP030118077, 8 pages.

* cited by examiner

METHODS AND SYSTEMS FOR GENERATING REGIONAL NESTING MESSAGES FOR VIDEO PICTURES

CROSS-REFERENCE TO RELATED APPLICATIONS

This application claims the benefit of U.S. Provisional Application No. 62/334,354, filed May 10, 2016. This application also claims the benefit of U.S. Provisional Application No. 62/336,435, filed May 13, 2016. This application also claims the benefit of U.S. Provisional Application No. 62/405,161, filed Oct. 6, 2016. All of these provisional applications are hereby incorporated by reference, in their entirety and for all purposes.

This application is a continuation of U.S. application Ser. No. 15/588,516, entitled "METHODS AND SYSTEMS FOR GENERATING REGIONAL NESTING MESSAGES FOR VIDEO PICTURES," filed May 5, 2017, which is assigned to the assignee hereof and expressly incorporated herein by reference in its entirety and for all purposes.

FIELD

This application is related to video coding. More specifically, this application relates to generating regional nesting messages for video pictures.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some implementations, techniques and systems are described for generating messages and/or metadata to be applied to regions of video pictures. In some cases, the techniques and systems can signal a set of regions of one or more pictures and a set of messages and/or data (e.g., metadata), and can associate a subset of the messages and/or the data to a subset of the specified regions. The messages can include supplemental enhancement information (SEI) messages or any other suitable messages that can be included in or with a video bitstream.

In some examples, the messages can include regional nesting messages for the video pictures. The regional nesting messages can be used to signal sets of picture regions (e.g., using region data defining each picture region) and information associated with the sets of picture regions. A regional nesting message can be signaled for a picture and the information in the regional nesting message can include one or more messages that are nested in the regional nesting message (referred to herein as "nested messages" or "region-nestable messages").

A nested message of the regional nesting message can include one or more sets of data (e.g., metadata or other set of data) that can be applied to one or more regions of the picture. In some examples, a set of data in a nested message may define a function that is to be performed on the one or more regions by a decoder device, a player device, or other device. In some illustrative examples, a set of data can include film grain characteristics used to perform a film grain synthesis function on one or more regions of a picture, tone mapping information used to perform a tone mapping function on one or more regions, or any other suitable data used to perform a function on a region of a video picture. In some cases, the set of data in a nested message may specify characteristics of the content that are specific to one or more regions. In one illustrative example, the set of data can include information about the maximum luminance of the content specified in the one or more regions. In other cases, the set of data in a nested message may specify hints or information that may be used by a decoder device, a player device, or other device to process the content specific to one or more regions according the constraints of the device or to the conditions under which the device operates. For example, the set of data can include information about a first set of filter coefficients that the encoder may consider suitable for processing the content, and the decoder device, player, or other device may choose to use those coefficients, or may derive a second of coefficients using the first set of coefficients, to be applied to the content belonging to the one or more regions for which the set of data is associated.

A regional nesting message for a picture can include region data defining each region of the picture only once, and the nested messages in the regional nesting message can include or be associated with region identifiers identifying the regions that the data sets in the nested messages are to be applied. For example, region data defining a region can be contained in the regional nesting message, with the region being defined for one or more pictures to which a nested message assigned to the region applies. In some cases, a nested message of the regional nesting message can include one or more region identifiers. A region identifier can be assigned to a set of data in the nested message to indicate a region that the set of data is to be applied. Using such a technique, region data does not have to be signaled individually for each nested message or for each set of data that is to be applied to a picture.

In some examples, a nested message in a regional nesting message includes a set of data (e.g., metadata, or other data set) and one or more region identifiers indicating any regions of the picture to which the set of data is applicable. In some examples, a nested message includes multiple sets of data defining multiple functions, and also region identifiers for the multiple sets of data to indicate the regions of the picture that the sets of data are to be applied. In some cases, multiple nested messages of a regional nesting message can be applicable to common regions in the same picture. For example, a first nested message of a regional nesting message can include one or more sets of data applicable to a first region, and a second nested message of the regional nesting message can include one or more sets of data applicable to the first region.

In some cases, a regional nesting message may define the same region more than once in the same regional nesting message; in this case, however, the identifier associated with the two instances of the regions would be different to differentiate the instances. Such examples may occur when a region that is repeated overlaps with one or more other regions and when one or more sets of data apply to the regions, in which case different priorities, indicated by an indicator, may be needed to determine the set of data applicable to one or more pixels in the overlapped regions.

In some examples, a regional nesting message is a regional nesting supplemental enhancement information (SEI) message. The regional nesting SEI message can include a plurality of region data defining multiple regions of a picture, and multiple nested SEI messages with sets of data and region identifiers.

According to at least one example of encoding video data, a method of encoding video data is provided. The method comprises obtaining the video data. The method further comprises generating, using the video data, an encoded video bitstream including a regional nesting message. The regional nesting message includes a plurality of nested messages and a plurality of region data defining a plurality of regions of a picture of the encoded video bitstream. A first nested message of the regional nesting message includes a first set of data and a first region identifier indicating that the first set of data is to be applied to a first region of the plurality of regions of the picture.

In another example of encoding video data, an apparatus is provided that includes a memory configured to store video data and a processor. The processor is configured to and can obtain the video data. The processor is further configured to and can generate, using the video data, an encoded video bitstream including a regional nesting message. The regional nesting message includes a plurality of nested messages and a plurality of region data defining a plurality of regions of a picture of the encoded video bitstream. A first nested message of the regional nesting message includes a first set of data and a first region identifier indicating that the first set of data is to be applied to a first region of the plurality of regions of the picture.

In another example of encoding video data, a non-transitory computer-readable medium is provided having stored thereon instructions that, when executed by one or more processors, cause the one or more processor to: obtain the video data; and generate, using the video data, an encoded video bitstream including a regional nesting message, the regional nesting message including a plurality of nested messages and a plurality of region data defining a plurality of regions of a picture of the encoded video bitstream, wherein a first nested message of the regional nesting message includes a first set of data and a first region identifier indicating that the first set of data is to be applied to a first region of the plurality of regions of the picture.

In another example of encoding video data, an apparatus is provided that includes means for obtaining the video data. The apparatus further includes means for generating, using the video data, an encoded video bitstream including a regional nesting message. The regional nesting message includes a plurality of nested messages and a plurality of region data defining a plurality of regions of a picture of the encoded video bitstream. A first nested message of the regional nesting message includes a first set of data and a first region identifier indicating that the first set of data is to be applied to a first region of the plurality of regions of the picture.

In some aspects, the regional nesting message is a regional nesting supplemental enhancement information (SEI) message, and wherein the plurality of nested messages are nested SEI messages.

In some aspects, the first set of data is used to perform a first function on the first region based on the first region identifier.

In some aspects, the first set of data specifies a characteristic of the first region based on the first region identifier.

In some aspects, region data defining a region of the plurality of regions of the picture is included once in the regional nesting message.

In some aspects, the first nested message further includes a second set of data, wherein the second set of data is associated with the first region identifier to indicate that the second set of data is to be applied to the first region.

In some aspects, the first set of data of the first nested message is applicable to multiple regions of the plurality of regions of the picture. In some aspects, the first nested message further includes a second region identifier indicating that the first set of data is to be applied to a second region of the plurality of regions of the picture. In some aspects, the first set of data is independently applicable to each of the first region and the second region.

In some aspects, the regional nesting message includes a second nested message, the second nested message including a second set of data and the first region identifier indicating that the second set of data is to be applied to the first region.

In some aspects, the regional nesting message further includes a number of the plurality of regions of the picture.

In some aspects, the plurality of region data define boundaries of the plurality of regions or define samples contained in each of the plurality of regions.

In some aspects, the plurality of region data define offsets of boundaries of the plurality of regions from boundaries of the picture.

In some aspects, the plurality of region data define the plurality of regions as rectangular regions.

In some aspects, when a sample of the picture is in two or more regions of the picture, a nested message of a first type that is applicable to a region of the two or more regions that has a largest region identifier value from among the two or more regions is applicable to the sample. In some aspects, another nested message of the first type applicable to another region of the two or more regions that does not have the largest region identifier value from among the two or more regions is not applicable to the sample.

In some aspects, wherein the regional nesting message further includes a syntax element identifying a purpose of the regional nesting message.

In some aspects, the regional nesting message further includes a number of the plurality of nested messages in the regional nesting message.

In some aspects, a nested message of the plurality of nested messages has a same persistence as if the nested message was not nested in the regional nesting message.

In some aspects, the regional nesting message includes a set of indices for the first nested message, the set of indices indicating one or more regions for which the first set of data is to be applied.

In some aspects, the set of indices includes at least the first region identifier.

In some aspects, the apparatus comprises a mobile device with a camera for capturing pictures.

According to at least one example of decoding video data, a method of decoding video data is provided. The method comprises receiving a video bitstream. The method further comprises obtaining, from the video bitstream, a regional nesting message, the regional nesting message including a plurality of nested messages and a plurality of region data defining a plurality of regions of a picture of the encoded video bitstream, wherein a first nested message of the regional nesting message includes a first set of data and a first region identifier indicating that the first set of data is to be applied to a first region of the plurality of regions of the picture.

In another example of decoding video data, an apparatus is provided that includes a memory configured to store video data and a processor. The processor is configured to and can receive a video bitstream. The processor is further configured to and can obtain, from the video bitstream, a regional nesting message, the regional nesting message including a plurality of nested messages and a plurality of region data defining a plurality of regions of a picture of the encoded video bitstream, wherein a first nested message of the regional nesting message includes a first set of data and a first region identifier indicating that the first set of data is to be applied to a first region of the plurality of regions of the picture.

In another example of decoding video data, a non-transitory computer-readable medium is provided having stored thereon instructions that, when executed by one or more processors, cause the one or more processor to: receive a video bitstream; and obtain, from the video bitstream, a regional nesting message, the regional nesting message including a plurality of nested messages and a plurality of region data defining a plurality of regions of a picture of the encoded video bitstream, wherein a first nested message of the regional nesting message includes a first set of data and a first region identifier indicating that the first set of data is to be applied to a first region of the plurality of regions of the picture.

In another example of decoding video data, an apparatus is provided that includes means for receiving a video bitstream. The apparatus further includes means for obtaining, from the video bitstream, a regional nesting message, the regional nesting message including a plurality of nested messages and a plurality of region data defining a plurality of regions of a picture of the encoded video bitstream, wherein a first nested message of the regional nesting message includes a first set of data and a first region identifier indicating that the first set of data is to be applied to a first region of the plurality of regions of the picture.

In some aspects, the first set of data is used to perform a first function on the first region based on the first region identifier. In some aspects, the method, apparatuses, and non-transitory computer-readable medium further includes decoding the picture and performing the first function on the first region of the picture using the first set of data. The first function is performed on the first region based on the first region identifier.

In some aspects, the first set of data specifies a characteristic of the first region based on the first region identifier.

In some aspects, the regional nesting message is a regional nesting supplemental enhancement information (SEI) message, and wherein the plurality of nested messages are nested SEI messages.

In some aspects, region data defining a region of the plurality of regions of the picture is included once in the regional nesting message.

In some aspects, the first nested message further includes a second set of data, wherein the second set of data is associated with the first region identifier to indicate that the second function is to be applied to the first region.

In some aspects, the first set of data of the first nested message is applicable to multiple regions of the plurality of regions of the picture.

In some aspects, the first nested message further includes a second region identifier indicating that the first set of data is to be applied to a second region of the plurality of regions of the picture.

In some aspects, the first set of data is independently applicable to each of the first region and the second region.

In some aspects, the regional nesting message includes a second nested message, the second nested message including a second set of data and the first region identifier indicating that the second set of data is to be applied to the first region.

In some aspects, the regional nesting message further includes a number of the plurality of regions of the picture.

In some aspects, the plurality of region data define boundaries of the plurality of regions or define samples contained in each of the plurality of regions.

In some aspects, the plurality of region data define offsets of boundaries of the plurality of regions from boundaries of the picture.

In some aspects, the plurality of region data define the plurality of regions as rectangular regions.

In some aspects, when a sample of the picture is in two or more regions of the picture, a nested message of a first type that is applicable to a region of the two or more regions that has a largest region identifier value from among the two or more regions is applicable to the sample. In some aspects, another nested message of the first type applicable to another region of the two or more regions that does not have the largest region identifier value from among the two or more regions is not applicable to the sample.

In some aspects, the regional nesting message further includes a syntax element identifying a purpose of the regional nesting message.

In some aspects, the regional nesting message further includes a number of the plurality of nested messages in the regional nesting message.

In some aspects, a nested message of the plurality of nested messages has a same persistence as if the nested message was not nested in the regional nesting message.

In some aspects, the regional nesting message includes a set of indices for the first nested message, the set of indices indicating one or more regions for which the first set of data is to be applied.

In some aspects, the set of indices includes at least the first region identifier.

In some aspects, the apparatus includes a display for displaying the remapped one or more samples. In some aspects, the apparatus includes a mobile device with a camera.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
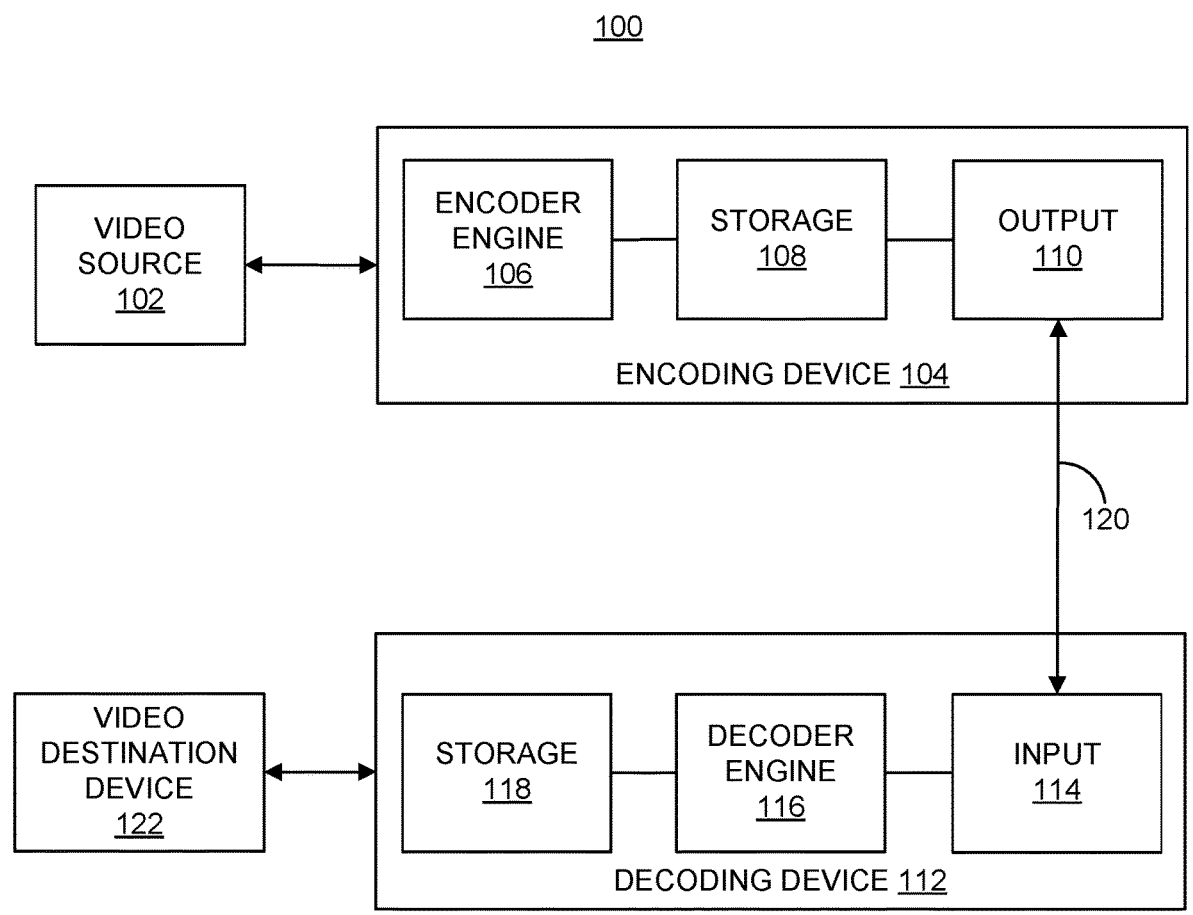
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video processing and video coding using video encoders, decoders, video players, and other video processing devices are described herein. In some examples, one or more systems and methods of processing video data are described for providing regional nesting messages that each includes multiple nested messages and data defining multiple regions. An example of a regional nesting message is a regional nesting Supplemental Enhancement Information (SEI) message. For example, a regional nesting SEI message can be generated for a picture, and can include region data defining a plurality of regions of the picture and a plurality of nested SEI messages that contains data used to perform functions on the plurality of regions. Details of such systems and methods are described in detail further below.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Many embodiments described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). In some cases, A CTU can also be referred to as a largest coding unit (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. For intra-block copy prediction, a set of motion parameters (e.g., one or more block vectors, or the like) can also be signaled for each PU and can be used for intra-block copy prediction. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, a video bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 8. An example of specific details of the decoding device 112 is described below with reference to FIG. 9.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, Supplemental Enhancement Information (SEI) messages can be included in video bitstreams. The HEVC Specification includes several SEI messages that are not necessary for decoding of coded pictures, but provide additional information that may be beneficial for decoder-side entities to process the decoded picture (e.g., for improving the display or processing of a decoded output for enhancing viewability of the content). Some SEI messages are necessary for decoding of coded pictures, such as those related to conformance, among others. While, in some cases, decoders are not required to parse or process the SEI messages, some application standards may impose requirements that mandate the presence of certain SEI messages in video bitstreams, and, in some cases, require using the information in these SEI messages for specific processing. In some examples, nesting SEI messages (e.g., scalable nesting SEI messages) include one or more SEI messages and indicate that the one or more SEI messages are applicable to one or more bitstream subsets (e.g., to a set of layers).

Figure 2:
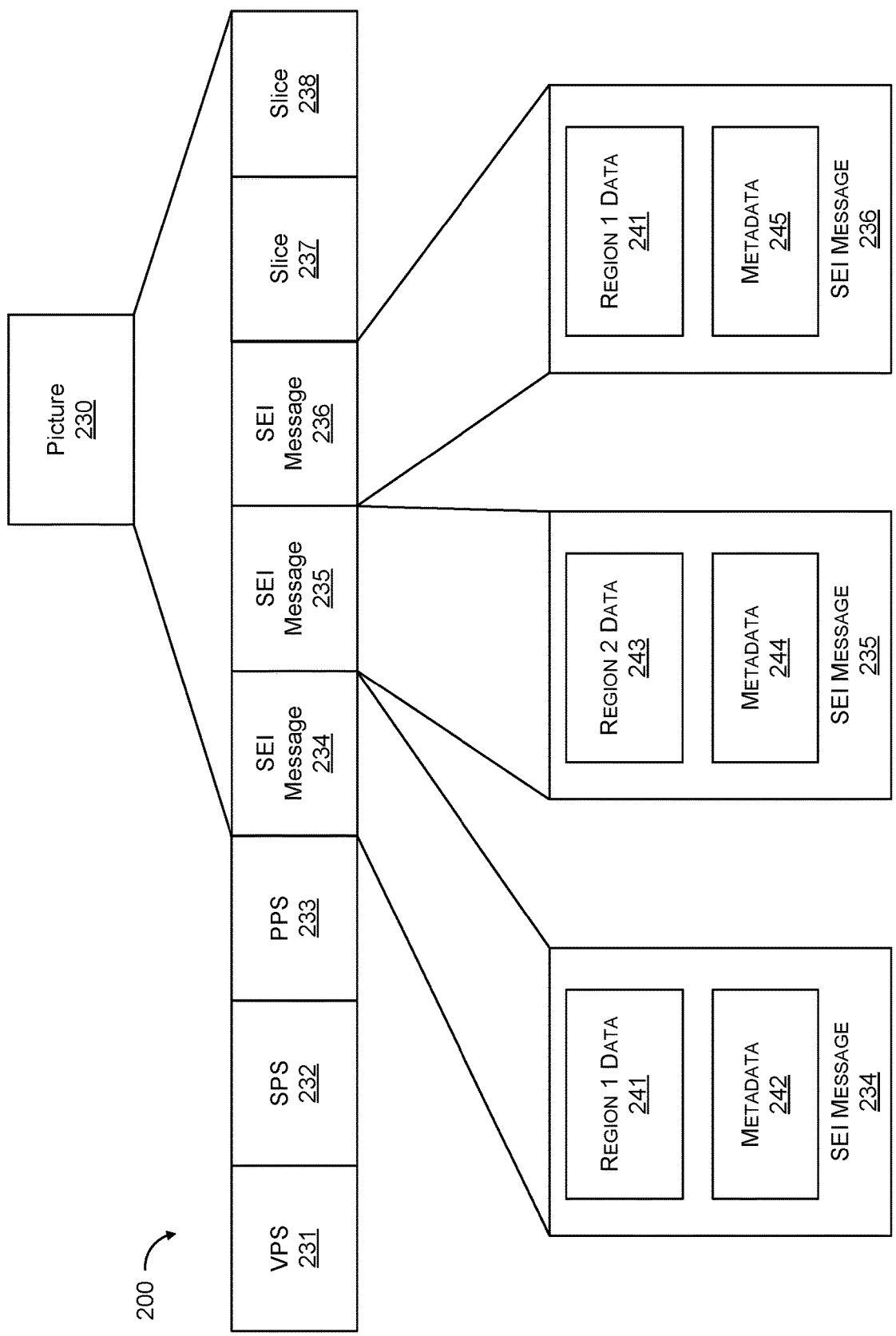
FIG. 2 is a diagram illustrating an example of a video bitstream with multiple supplemental enhancement information (SEI) messages, in accordance with some examples.

FIG. 2 is a diagram of a portion of an example video bitstream 200. The video bitstream 200 includes a VPS 231, a SPS 232, and a PPS 233. As previously described, each slice of pictures of the video bitstream 200 references an active VPS, SPS, and PPS (e.g., using a VPS ID, an SPS ID, and a PPS ID) to access information that a decoding device may use for decoding the slice. The PPS 233 can include information that applies to all slices in a given picture, such as picture 230. The SPS 232 can include information that applies to all pictures in the video bitstream 200 or to all pictures in a same coded video sequence (CVS) of the video bitstream 200. The VPS 231 can include information that applies to all layers within the video bitstream 200 or a CVS of the video bitstream 200. For example, the VPS 231 can include a syntax structure with syntax elements that apply to entire coded video sequences. In the example shown in FIG. 2, the VPS 231, the SPS 232, and the PPS 233 are signaled in-band with the video bitstream 200. In other examples, the VPS 231, the SPS 232, and/or the PPS 233 may be transmitted out-of-band in a separate transmission than the NAL units of the bitstream 200 containing coded video data.

The video bitstream also includes information related to a picture 230, including SEI message 234, SEI message 235, SEI message 236, slice 237, and slice 238. While only two slices 237 and 238 of the picture 230 are shown in the example of FIG. 2, the picture 230 can be partitioned into more than two slices. Also, in some cases, information other than that shown in FIG. 2 may be included in the video bitstream 200 for the picture 230.

Sets of data (e.g., metadata or other data) can be included in SEI messages, such as SEI messages 234, 235, and 236. The metadata can be used by a decoder device, a player device, or other device on the receiver-side to perform one or more functions on the pictures (e.g., before or after the pictures are decoded, but generally after), can specify characteristics of the content specific to one or more regions, or can provide hints or other information that a decoder device, a player device, or other device can use to process the content of one or more regions (e.g., according to the constraints of the device or to the conditions under which the device operates), or the like. In one illustrative example, the SMPTE-2094-1 standard describes dynamic metadata that is useful for color volume transformation of video content, such as when the targeted display (e.g., of an end-user device) is expected to be of different luminance, color volume, or transfer characteristics compared to a mastering display (e.g., a reference monitor at the video production side). For example, the metadata can be bounded by the characteristics of the mastering display (e.g., as defined in SMPTE ST 2086:201x), but to ensure creative intent is maintained, content dependent metadata can also be used. Metadata information sent from the encoder may be beneficial for the pictures to be displayed when the targeted display has different characteristics. Several applications have been specified in SMPTE-2094-related documents and different carriage of metadata is also specified to support these applications. Although applications in the context of video standards may refer to video streaming, video broadcasting, video telephony, video conferencing and other such use cases, the word "application" in this document is also used to refer to specific conditions under which some of the color volume transformations are performed under SMPTE-2094. Examples of such "applications" include when the content is to be displayed in smaller color volume or lower luminance, when High Dynamic Range (HDR) content is to be displayed at a Standard Dynamic Range (SDR) display, among other applications. Other "applications" may also be specified.

Common features of metadata (e.g., corresponding to SMPTE-2094-1) across various applications include targeted display characteristics (e.g., color primaries, white point, among other characteristics), persistence, and description of regions to which the metadata are applicable. In some cases, one or more metadata sets may be sent for regions (e.g., rectangular regions or regions of other shapes) in different "applications" (of the SMPTE-2094 standard), for different target displays, and for other purposes. For example, metadata (e.g., SMPTE-2094-1 metadata or other metadata) sent to a decoder can be associated with regions to which the metadata is applicable.

Returning to FIG. 2, each of the SEI message 234, the SEI message 235, and the SEI message 236 include region data defining different regions of the picture 230 and metadata defining a function that is to be performed on the region of the picture 230 corresponding to the particular SEI message. For example, the SEI message 234 includes region 1 data 241 defining a first region of the picture 230 and a first set of metadata 242 defining a function that can be performed on the first region, characteristics of the first region, hints or other information relating to device constraints or operating conditions, or the like. The first region can be similar to the region 1 402 shown in FIG. 4A. The SEI message 235 includes region 2 data 243 defining a second region of the picture 230 and a second set of metadata 244 defining a function, characteristics, hints, or the like that apply to the second region. The second region can be similar to the region 2 404 shown in FIG. 4A. The SEI message 236 also includes the region 1 data 241 defining the first region of the picture, but includes a third set of metadata 245 that defines another function, other characteristics, other hints, or the like that apply to the first region.

Various problems exist with respect to metadata for video content (e.g., SMPTE-2094 metadata or other data related to pictures). As one example, for metadata that is applicable to picture regions, to support different applications, more than one metadata set may be signalled for the same region, in which case data defining a given region is signaled for each metadata set that is applicable to that region. For example, as shown in FIG. 2, the region 1 data 241 defining the first region of the picture 230 is signaled both for metadata 242 in SEI message 234 and for metadata 245 in SEI message 236. However, it is inefficient to signal the regions (e.g., the region data) for each individual metadata set. The number of metadata sets can become very large. For example, there may be three metadata sets for each of ten targeted displays and each of fifteen applications at a given time instance. Signaling the region data individually for each of these metadata sets can create problems.

Other problems exist with respect to SEI messages. For example, some SEI messages can be applied in a region-specific manner. Not having a common framework to support the different region-specific applications would result in repeated definitions of region-specific syntax elements across SEI messages. One illustrative example of an SEI message that may have a region-specific application or function includes a film grain characteristics SEI message, which is used to convey a parametric model for film grain synthesis to the decoder. Film grain characteristics can be perceived differently in different parts of a picture (e.g., in different regions of the picture). Enabling region-based signalling would help in describing these characteristics. For example, such region-based signalling would help for mixed content where there are both natural images (to which a film grain model may apply to) and artificially generated content (which may not have any film grain associated with it) in the same picture.

Another illustrative example of an SEI message that may have a region-specific application is a tone mapping information SEI message. A tone mapping information SEI message is signalled to provide information or a set of data to enable remapping of color samples of the output decoded pictures for customization to particular display environments. In one illustrative example, several video applications (e.g., a news broadcast, a sporting event, or other video applications) allow picture-in-picture modes for simultaneously displaying data that appear from different sources on a display. The characteristics of these two (or more) video sources could be very different. For example, the main video (displayed using the full display area) may be captured in a studio where the lighting conditions are controlled, and the inset picture (displayed as a smaller window over the full display area) may be captured in a natural environment where the lighting is very different (e.g. dark). When different content (from different sources) with different characteristics are present in the same video, it would be beneficial to allow tone-mapping that is tuned to the particular sources.

Other illustrative examples of an SEI message that may have a region-specific application are a post filter hint SEI message and a chroma resampling filter hint SEI message. For example, the post filter hint SEI message is used to indicate information or a set of data useful to design post-filters for use in post-processing of a decoded picture. Filters are very useful for processing content in order to mitigate the effects of processing, and/or to enhance the quality of the content displayed. The characteristics of the video signals (or the content) vary based on the characteristics of the regions of the content. A similar situation applies for the chroma resampling filter hint SEI message.

Another illustrative example of an SEI message that may have a region-specific application is a color remapping information SEI message. The color remapping information (CRI) SEI message has several purposes, one of which is to adapt the content from one color representation to another color representation (e.g. from BT.2020 to BT.709, color volume conversion, or other color representation adaptation or conversion). Another purpose of the CRI SEI message is for reshaping the video signal to satisfy various application requirements. Here again, for mixed content and content with different characteristics, the CRI parameters in the SEI message that are to be applied could differ across different regions within the same picture.

Another illustrative example of an SEI message that may have a region-specific application is a knee function information SEI message. The motivation for region-based signalling of knee function information is similar to that of the tone-mapping information—providing information to enable mapping of the color samples of decoded pictures for customization to particular display environments. The difference is that tone mapping information applies the mapping function in a non-linear domain, while the knee function information applies the mapping function in a linear light domain.

In all of the above examples, the current signaling of the SEI messages only allows signaling of information that applies to the whole picture. It would beneficial to allow region-based signaling without redefining the actual SEI messages.

Further, existing SEI messages may be re-usable for different applications that use region-specific signaling. In one illustrative example, the SMPTE 2094-30 standard uses the information that is signalled in the color remapping information (CRI) SEI message. Avoiding a redefinition of the CRI SEI message for the SMPTE 2094-30 standard would be beneficial. However, there are certain syntax elements in SMPTE 2094-30 that are not included in the CRI SEI message. Also, an extension to the CRI SEI message that is specific to SMPTE-2094 may not be a clean and efficient design.

Embodiments described herein include methods and systems for generating messages and/or sets of data (e.g., metadata or other data) to be applied to regions of video pictures. In some cases, the methods and systems can signal a set of regions (or subsets) of pictures, a set of messages and/or data (e.g., metadata or other data), and an association of each of the messages to the regions. For example, a subset of the messages and/or the data can be associated with a subset of the specified regions. The messages can include supplemental enhancement information (SEI) messages or any other suitable messages that can be included in or with a video bitstream for video coding and video application standards, such as H.265/HEVC, H.264/AVC, BDA, MPEG DVB or others. The examples described herein can be applied independently, or in combination with one or more other examples, embodiments, or implementations. One or more syntax elements associated within a particular iteration of the loop may be associated with all the iterations of the loop and signaled outside the loop, or vice versa.

In some examples, regional nesting messages can be generated for video pictures. A regional nesting message can be generated for a picture and can be used to signal a set of picture regions (e.g., using region data defining each picture region), a set of messages as nested messages in the regional nesting messages (referred to herein as "nested messages" or "region-nestable messages"), and the association of the nested messages to the picture regions. For example, a set of regions can be specified in the regional nesting message along with a set of nested messages associated with the regions.

A nested message defined in a regional nesting message of a picture can include one or more sets of data (e.g., metadata or other set of data) that can be applied to one or more regions of the picture. In some examples, a set of data in a nested message defines a function that is to be performed on the one or more regions by a decoder device, a player device, or other device. For example, a set of data can define any suitable function, such as the functions performed using the film grain characteristics SEI message, the tone mapping information SEI message, the post filter hint SEI message, the chroma resampling filter hint SEI message, the color remapping information SEI message, the knee function information SEI message, or any other suitable data used to perform a function on a region of a video picture. In some examples, a set of data in a nested message defines characteristics of the content contained in one or more regions. In one illustrative example, the set of data can include information specifying the maximum luminance of the content contained in the one or more regions. In some examples, the set of data in a nested message may specify hints or other information that may be used by a decoder device, a player device, or other device to process the content contained in one or more regions according constraints of the device or to the conditions under which the device operates. In one illustrative example, the set of data can include information about a first set of filter coefficients that the encoder may consider suitable for processing the content, and the decoder device, player, or other device may choose to use those coefficients to be applied to the content belonging to the one or more regions for which the set of data is associated. In another example, the device may derive a second of coefficients using the first set of coefficients, and may apply the second set of coefficients to the content of the one or more regions.

Region data in a regional nesting message can define each region of a picture once, and the nested messages in the regional nesting message can be associated with region identifiers that identify the regions that the data sets in the nested messages are to be applied. For example, a nested message of the regional nesting message can include one or more region identifiers that indicate the regions that any data in the nested message is to be applied. A region identifier can be assigned to a set of data in the nested message to indicate a region that the set of data is to be applied. In some examples, a set of indices can be included in a nested message that indicate or point to one or more regions (e.g., using the region identifiers) for which one or more data sets in the nested message apply. Using such techniques, region data does not have to be signaled individually for each nested message or for each set of data that is to be applied to a picture.

One example of a regional nesting message is a regional nesting supplemental enhancement information (SEI) message. A regional nesting SEI message for a picture can include a plurality of region data defining multiple regions of the picture, and can also include multiple nested SEI messages with sets of data and region identifiers. For example, a regional nesting SEI message can be generated and signaled that specifies rectangular regions (or regions having other suitable shapes) to which one or more nested SEI messages apply. Various examples are described below using nesting SEI messages containing nested SEI messages for illustrative purposes, but one of ordinary skill will appreciate that the concepts covered by the examples are also applicable to other types of nesting messages that contain nested messages.

In some examples, a device (e.g., an encoding device or other suitable device) can signal a set of regions of one or more pictures and a list of metadata sets or SEI messages. For example, the device can signal a set of regions of a picture and a list of metadata sets associated with one or more of the regions of the picture. In another example, the device can signal a set of regions of a picture and SEI messages associated with one or more of the regions. An SEI message can include a set of data or metadata defining a function that can be performed on a region of the picture, defining characteristics of the region, defining hints or other information a device can use to process the region and that relates to constraints or operating conditions of the device, or the like. In some aspects, as described above, the set of regions can be signaled in a regional nesting SEI message, and the nesting SEI message can include nested SEI messages and metadata that are associated with the set of regions.

Figure 3:
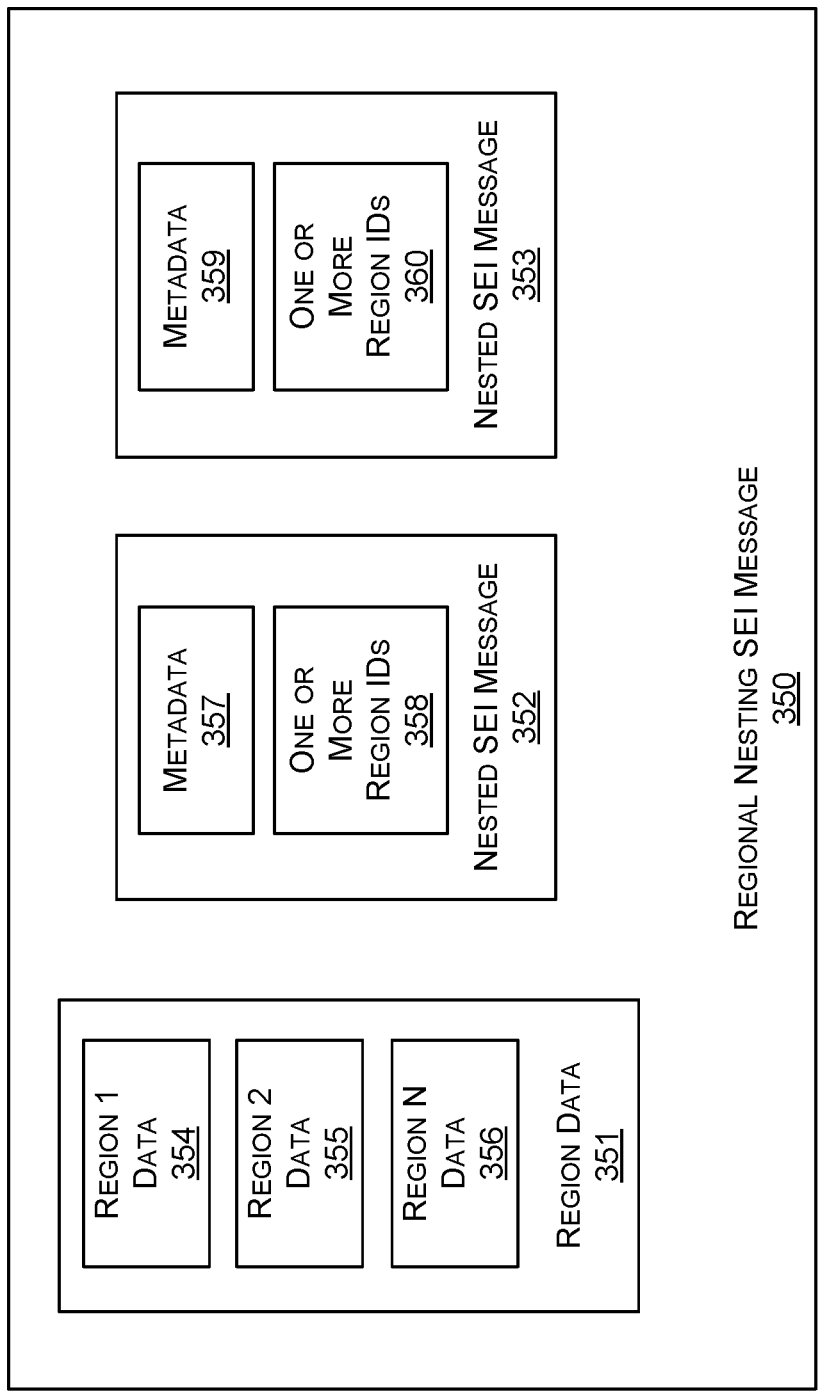
FIG. 3 is a diagram illustrating an example of a regional nesting SEI message, in accordance with some examples.

FIG. 3 is a diagram illustrating an example of a regional nesting SEI message 350 generated for a picture of a video bitstream. The regional nesting SEI message 350 can be generated by a device, such as the encoding device 104 or other device that can store or transmit the regional nesting SEI message 350 in or with a video bitstream to a receiving device, such as the decoding device 112 or other device that can decode or otherwise process the regional nesting SEI message 350. The regional nesting SEI message 350 includes region data 351 defining multiple regions in the picture and also includes multiple nested SEI messages (nested SEI message 352 and nested SEI message 353).

The region data 351 includes region 1 data 354, region 2 data 355, through region N data 356. The region 1 data 354 defines a first region in the picture, the region 2 data 355 defines a second region in the picture, and the region N data 356 defines an Nth region in the picture. The number of regions defined by region data for a given regional nesting SEI message can include any suitable number of regions (e.g., two regions, three regions, five regions, or any other suitable number of regions), which can be defined by the application or standard used to define the video content. In some cases, the encoder can make the determination of how many regions are defined for a picture based on the application or metadata that is signaled and the content. For example, the number of regions for a picture are signaled in or with the bitstream, and the decoder, player, display, or other device obtains the region information from the bitstream.

In some examples, the region data 351 can include a number of regions of the picture that are specified in the regional nesting SEI message 350, such that information associated with the metadata signaled for these regions may be applicable to one or more of the regions. For example, a syntax element can be included in the syntax of the nesting SEI message 350 indicating the number of regions (e.g., rns_num_rect_regions shown in the example syntax below, which can also be re-written as regional_nesting_num_rect_regions).

The region data 351 can define the different regions of the picture in various ways. In some examples, the regions are specified to be rectangular regions. In other examples, the regions can be specified as any other suitable shape. For example, non-rectangular regions may be signaled and the syntax elements associated with indicating the region and the samples to which the metadata may be applicable are signalled.

In some examples, the region data 351 can include a set of syntax elements specifying the boundaries of a region. In some implementations, the boundaries of a region can be defined by specifying offsets of the region boundaries from the corresponding boundaries of the picture. Examples of syntax elements specifying boundary offsets of a region are shown below in the example syntax structures (e.g., rns_rect_region_left_offset[i], rns_rect_region_top_offset[i], rns_rect_region_right_offset[i], and rns_rect_region_bottom_offset[i]). For example, rns_rect_region_left_offset[i] specifies the horizontal offset of the top-left sample of the i-th rectangular region from the left picture boundary specified in the nesting SEI message. In some implementations, the region data 351 includes syntax elements associated with the boundaries that specify the location of the top-left and the bottom-right samples of the rectangular region. Other forms of signaling the boundaries may also be used, such as signaling the top-right and bottom-left samples of the rectangular region, or any other suitable forms of signaling the boundaries.

In some examples, the regions are specified on boundaries of a picture. There are different types of pictures boundaries, including decoded picture boundaries and output picture boundaries (or conformance cropped boundaries or windows). Decoded picture boundaries are what are decoded and stored in the decoded picture buffer. However, before being output, a picture may be resized (e.g., to a size that is smaller than the decoded picture). For example, a decoded picture may be different than an output picture due to one or more reasons, such as because the picture resolution is not a multiple of a smallest coding unit (CU) size, because the decoded picture has some information or content that may not be presentable for output, or for other reasons.

In some examples, the regions are specified on the decoded picture boundaries. For example, offsets for a rectangular region (or other shape) of a picture can be specified in units of luma sample positions (or other color component of the picture, such as chroma). In one illustrative example, the i-th rectangular region contains the luma samples with horizontal picture coordinates from SubWidthC*regional_nesting_red_left_offset[i] to pic_width_in_luma_samples−(SubWidthC*regional_nesting_rect_right_offset[i]+1), inclusive, and vertical picture coordinates from SubHeightC*regional_nesting_rect_top_offset[i] to pic_height_in_luma_samples−

(SubHeightC*regional_nesting_red_bottom_offset[i]+1), inclusive. SubWidthC and SubHeightC are used to scale the syntax elements to sample units. For instance, in 4:2:0 video, if boundaries do not begin at an even row and column, it is unclear if the chroma value belongs to a region or not. So, in this example using 4:2:0 video, units of two sample units can be used, in which case SubWidthC and SubHeightC are both 2. In another example, for 4:4:4 video, SubWidthC and SubHeightC would be 1.

In some examples, the regions are specified on the conformance cropped windows. For example, in some cases, a picture size that does not represent an integer multiple of the minimum CU size can be coded by extending the picture area using arbitrary sample values and specifying a conformance cropping window in a parameter set (e.g., a PPS, SPS, VPS, or the like). For instance, the cropping window can include parameters to indicate the output region of a coded picture. In some examples, the cropping window parameters can indicate when output pictures are smaller than decoded pictures.

In some examples, the regions are specified on the area specified by the picture boundaries, which are specified by the syntax elements in the bitstream associated with the picture width and the picture height. For example, if there are other means of specifying boundaries, other than decoded picture boundaries and output picture boundaries, the regions can be specified on those boundaries.

In some examples, the regions are signalled based on signaling of pan-scan rectangles. In some cases, a pan-scan rectangle can provide conformance cropping window parameters to indicate when output pictures are smaller than decoded pictures. For example, a pan-scan rectangle syntax can specify coordinates of one or more rectangles relative to the conformance cropping window (e.g., specified by an active parameter set, such as the SPS, PPS, or VPS). In one illustrative example, each coordinate can be specified in units of one-sixteenth luma sample spacing relative to a luma sampling grid. One of ordinary skill in the art will appreciate that any spacing can be used for the coordinates. The pan-scan rectangles may be included in an SEI message, or may be signaled in the bitstream or conveyed outside the bitstream. The pan-scan rectangles may be associated to the regional nesting SEI message 350 based on region IDs described above.

The region data 351 can also include the samples (e.g., pixels of the picture) associated with one or more regions. In one example, the region 1 data 354 can include the ID of the first region, information defining the boundaries of the first region, and the samples associated with the first region. A set of syntax elements can be used to specify the region ID, the boundaries, and the samples of the first region. In some implementations, a region can include all of the samples that fall within the boundary of the region. In some implementations, in addition to the samples that lie within the boundary of a region, the samples on a boundary of the region, or samples that are derived to be near to a boundary of the region, are also associated with the metadata that is signaled for being applied to the region. For example, the region ID for the first region may be mapped to the pixels that lie within the boundary of the first region, and can also be mapped to the pixels that are on the boundary and/or samples that are derived to be near a boundary of the first region.

In some implementations, the regions signaled for any particular picture do not overlap, such that no sample exists that is associated with more than one region specified for a given picture. In other implementations, the regions for a picture can be overlapping, in which case samples can belong to multiple regions.

In some examples, the region data 351 can include an ID for each region defined by the region data 351. For example, the region 1 data 354 can include a first ID for the first region, and the region 2 data 355 can include a second ID for the second region. An example of a syntax element for signaling the region ID is shown below (e.g., rns_rect_region_id[i], indicating an identifier for the i-th rectangular region specified in the SEI message). A region ID may be used to determine the applicability of metadata in a particular nested SEI message to a region associated with the identifier. In some cases, the region IDs of the different regions can be associated with the metadata 357, 359 in the nested SEI messages 352 and 353 for which the regions are associated. In some cases, a region ID can be used to indicate a priority of the regions in a picture. In one illustrative example, when a sample is associated with more than one region, the metadata that is applicable to the sample is the metadata associated with the region that includes the sample and that has the largest value of the identifier from among the regions that include the sample. For instance, the first nested SEI message 352 (and the metadata 357) may be applicable to the first region, and the second nested SEI message 353 (and the metadata 359) may be applicable to the second region. In such an example, if a sample in the picture is in the first region and in the second region, and the second region has a higher region ID than the first region, the metadata 359 of the nested SEI message 353 will be applied to the sample by the decoder or other device. In some examples, this priority ordering is used when choosing multiple metadata that are of the same type or purpose and that may be defined for overlapped regions of a picture. For instance, choosing an SEI message and/or metadata to apply based on priority can be restricted to nested SEI messages of the same type. In one illustrative example, if a region 1 and a region 2 overlap, and if a tone map SEI applies to region 1 and a CRI message applies to region 2, there is no problem with priority. However, a problem can occur when a nested SEI of a first type (e.g., a nested tone map SEI) applies to region 1 and another nested SEI of the first type applies to region 2, in which case priority can be sued to resolve the overlapping pixels of the two regions.

Figure 4:
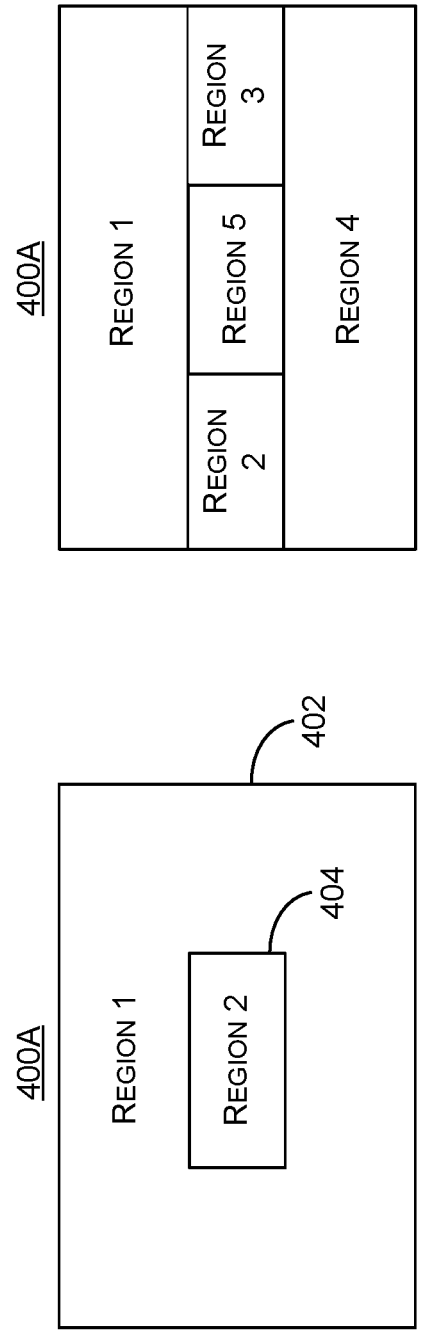
FIG. 4A is a diagram illustrating an example of picture with prioritized regions, in accordance with some examples.
FIG. 4B is a diagram illustrating an example of picture without prioritized regions, in accordance with some examples.

Signaling regions with priority can help make signaling more efficient. For example, as shown in FIG. 4A, a picture 400A contains two regions, including a first region 402 (Region 1) and a second region 404 (Region 2). The second region 404 is a small rectangular region in the middle of the picture, and the first region 402 is the rest of the picture. In one example, the first region 402 of the picture has one set of metadata applied (e.g., metadata 357), and the rest of the picture (the second region 404) has another set of metadata applied (e.g., metadata 359). The first region 402 can be signalled as the full picture with a priority lower than the second region 404. For example, using priority identifiers (IDs), only two regions have to be specified, with the second region 404 having a higher priority ID. Without priority IDs, five regions have to be specified, as shown in FIG. 4B. For example, without priority IDs, a picture would not be able have overlapping regions because it would not clear how the overlapping regions would be handled. In one illustrative example, as shown in FIG. 4B, not using priority would result in five regions being signalled because the regions will have to be non-overlapping.

In some aspects, the device (e.g., encoding device or other device) can generate the region data 351 so that it specifies (e.g., using a syntax element) the unit that is used to define the boundaries and the applicable samples of the regions in the nesting SEI message. For example, a value of the syntax element may specify that the unit used is sample positions. In some implementations, the sample positions used as units to describe the boundaries of the region correspond to luma sample positions. For example, the offsets for a rectangular region can be specified in units of luma sample positions. In some implementations, the sample positions may correspond to the positions of one or more of the components (e.g., a luma component, one or more of the chroma components, a combination of luma and chroma components, or the like) of the picture. In another example, another value may specify the unit to be that of coding tree units (CTUs). In another example, a further value may specify that the unit is tiles. In some examples, constraints may be included on syntax elements based on whether tiles are enabled or not in the bitstream.

In some embodiments, constraints can be added to the syntax or semantics of the regional nesting SEI message 350 so that one or more syntax elements specifying a region represent a valid region or represent a non-empty region. For example, a constraint can indicate that a coordinate of a sample position is less than or more than another coordinate of another sample position. In one illustrative example, a constraint may be added that indicates the horizontal coordinate of the top-left sample position is less than the horizontal coordinate of the bottom-right sample position of a region. In another illustrative example, a similar constraint may be added that the vertical coordinate of the top-left sample position is less than the vertical coordinate of the bottom-right sample position of a region. Similar constraints may be added when other forms of image boundaries are specified to ensure that the regions specified are non-empty or are a valid region. One illustrative example of such a constraint is as follows: the value of SubWidthC*(regional_nesting_rect_left_offset[i]+regional_nesting_rect_right_offset[i]) shall be less than pic_width_in_luma_samples and the value of SubHeightC*(regional_nesting_rect_top_offset[i]+regional_nesting_rect_bottom_offset[i]) shall be less than pic_height_in_luma_samples.

In some embodiments, a constraint can be added to the syntax or semantics of the nesting SEI message 350 so that when one or more instances of a nested SEI message of a particular type (or purpose) is defined for two or more regions of a picture, the value of an identifier of the region (e.g., a region ID, which can be signaled using a syntax element, such as rns_rect_region_id or regional_nesting_rect_region_id) shall not be the same for any of the two or more regions. In some examples, the type of the SEI message is defined by a payloadType variable. In some examples, the type of the SEI message is defined by a combination of the payloadType variable and the values of a subset of the syntax elements in the SEI message. One illustrative example of such a constraint is as follows: it is a requirement of bitstream conformance that the value of regional_nesting_rect_region_id[i] shall not be the same for any two different values of i in the range of 0 to regional_nesting_num_rect_regions−1, inclusive, in the regional nesting SEI message; When an SEI message of a particular type in listOfRegionNestableMessageTypes is present in one regional nesting SEI message and applies to a list of regions listA in the current picture and another SEI message of the same type in listOfRegionNestableMessageTypes is present in a regional nesting SEI message and applies to a list of regions listB in the current picture, it is a requirement of bitstream conformance that, for any pair or regions formed by choosing one from listA and the other from listB, the value of regional_nesting_rect_region_id[ ] of the two regions shall not be the same unless the two regions are identical and the two SEI messages are identical.

As explained previously, the device can generate the regional nesting SEI message 350 so that it signals to the decoder or other device region-specific application of the nested SEI messages 352 and 353. Returning to FIG. 3, the regional nesting SEI message 350 is shown as having two nested SEI messages, including the nested SEI message 352 and the nested SEI message 353. One or ordinary skill will appreciate that the regional nesting SEI message 350 can include any suitable number of nested SEI messages. The number of nested SEI messages nested in the regional nesting SEI message 350 can be based on the number of regions of the picture, based on the number of applications or functions that are to be applied to the picture, based on the number of characteristics an encoder or other device determines should be specified for regions of the picture, or based on other parameters.

The different nested SEI messages 352 and 353 can be generated by an encoder or other device and used by a decoder or other device for different purposes. The nested SEI messages 352 and 353 have different metadata that achieves the purposes of the SEI messages 352, 353. In one example, the metadata of the SEI message 352 or 353 can be used by a decoder device, player, or other device to perform a function related to the purpose of the SEI message 352 or 353. In another example, the metadata of the SEI message 352 or 353 can specify characteristics of a picture (e.g., of a region of the picture) according to the purpose of the SEI message 352 or 353. The different nested SEI messages 352 and 353 can have defined types that indicate the purpose of the nested SEI messages. For instance, the nested SEI message 352 can have a first type and can be used for a first purpose, and the nested SEI message 353 can have a second type and can be used for a second purpose. The nested SEI messages 352 and 353 can be used for any purpose that is applicable to a region of a video picture. Illustrative examples of SEI or metadata types of the nested SEI messages 352, 353 can include a film grain characteristics SEI message, a post filter hint SEI message, a chroma resampling filter hint SEI message, a tone mapping information SEI message, a knee function information SEI message, a chroma remapping information SEI message, or any other SEI message or data set that can be applied on a regional basis to one or more regions of a picture.

In one illustrative example, the nested SEI message 352 can be used for converting from a first dynamic range to a second dynamic range, such as from high dynamic range (HDR) to standard dynamic range (SDR). For instance, source content mastered with high dynamic range/wide color gamut (HDR/WCG) can be transformed for presentation on a display having a smaller color volume, such as an SDR display. In such an example, the nested SEI message 352 can include a CRI SEI message, and the metadata 357 of the nested SEI message 352 can include the data used to perform the dynamic range conversion. For example, the metadata 357 can include a pre-look up table, a color remap matrix, and a post-look up table. The pre- and post-look up tables can include different or similar piecewise linear functions (e.g., a piecewise linear function for each color component). The color remap matrix can include a linear model, such as a 3×3 matrix when three color components are present. For example, the color remap matrix can be applied across all color components of each picture sample and can be used to map the coefficients of the color components.

In another illustrative example, the nested SEI message 353 can be used for tone mapping, and can include a tone mapping information SEI message. The metadata 359 of the nested SEI message 353 can include the data used to perform the tone mapping for the one or more regions specified by the one or more region IDs 360.

In some implementations, the device can generate the regional nesting SEI message 350 so that it specifies semantics of the nested SEI messages (e.g., nested SEI messages 352, 353) such that each of the nested SEI messages or metadata sets is applicable to one or more of the regions specified in the nested SEI message (e.g., as indicated by the one or more region IDs 358 and 360). In some cases, one or more region identifiers (IDs), indices, or pointers can be included in or associated with a nested SEI message to indicate which regions the nested SEI message is applicable. For example, for each nested SEI message (e.g., nested SEI messages 352, 353) or metadata set (e.g., metadata 357, 359), the device can generate the regional nesting SEI message 350 to signal a set of indices, identifiers, or pointers to the list of the regions associated with the nested SEI message, the set of indices, identifiers, or pointers indicating that the nested SEI message or metadata set is to be applied to each region indicated by each of the indices, identifiers, or pointers. As shown in FIG. 3, the one or more region IDs 358 defined in the nested SEI message 352 indicate one or more regions of the picture (defined by region data 351) that the metadata 357 is to be applied. For example, the one or more region IDs 358 can be included as indices or pointers that point to the corresponding regions. In some cases, a decoder (or other device) can apply the metadata 357 (and thus perform the function, interpret the characteristics, or use hints or other information associated with the metadata 357) only to the one or more regions of the picture specified by the one or more region IDs 358. The decoder can also apply the metadata 359 only to the one or more regions of the picture specified by the one or more region IDs 360. The region IDs 358 and 360 do not re-define the parameters of the regions, but rather reference the regions defined by the region data 351. The regions thus do not have to be re-defined for each nested SEI message in the regional nesting SEI message 350. By only defining the regions once for all of the nested SEIs in the regional nesting SEI message 350, a number of bytes is saved, which can increase coding efficiency, bandwidth, among other benefits.

In some implementations, the device can generate the regional nesting SEI message 350 to contain a list of indices, identifiers, or pointers to one or more SEI messages that may be associated with a current picture. In some examples, the list of indices, identifiers, or pointers to SEI messages may be signaled instead of explicitly nesting SEI messages within the regional nesting SEI message 350. The indices, identifiers, or pointers may include one or more identifiers signalled in the SEI messages, a payload type of the SEI message, or other forms of identification.

In some implementations, the device can generate the regional nesting SEI message 350 so that it includes one or more syntax elements that identify the purpose of the regional nesting SEI message 350. For example, the purpose does not contradict with the purposes and/or semantics of the nested SEI messages in the nesting SEI message 350, and can govern an overall purpose to which the nested messages all contribute. In one example, the ID value 1 could indicate that the nested SEI messages together (e.g., a tone mapper, a filter, etc.) are used to provide the best re-produceability of video content in legacy displays. In another example, the ID value can be used by an external application standard. In some examples, one or more identifiers can be signaled that determines the purpose of the nested SEI messages in the regional nesting SEI message 350 or the application that uses the SEI messages. In some examples, the identifier may also be used to specify the syntax and semantics of one or more syntax elements within the nesting SEI message 350. An example syntax element of the identifier is shown in the example syntax shown below (e.g., as rns_id or regional_nesting_id).

In some implementations, the device can generate the regional nesting SEI message 350 so that it includes a number of the SEI messages or metadata sets signaled in the nesting SEI message 350. An example syntax element for signaling the number is shown in the example syntax shown below (e.g., as num_seis_in_rns_minus1 or num_sei_messages_in_regional_nesting_minus1). In some implementations, the device can signal a number that is used to derive the number of SEI messages or metadata sets signaled in the nesting SEI message.

In some implementations, the regional nesting SEI message 350 can be generated to include a number that indicates the number of bytes signaled, followed by those bytes associated with each nested SEI message (nested SEI messages 352, 353) or each metadata set (e.g., metadata 357, 359) associated with the nesting SEI message 350. The interpretation of the bytes may be specified by means outside of the HEVC or other relevant Specification, or may be based on the value of an identifier of the regional nesting SEI message 350.

In some implementations, the persistence of a nesting SEI message (e.g., regional nesting SEI message 350) is specified in terms of those of the nested SEI messages or metadata sets nested in the nesting SEI message. Persistence or persistence scope of an SEI message indicates how long the SEI message is applicable or valid. In some cases, each nested SEI message has the same persistence scope as if the SEI message were not nested. Examples of the persistence scope of different SEI message types are shown in Table 1 below. In some cases, the nested SEI messages are applied independently to the regions defined in the regional nesting SEI message, and the persistence of the nested SEI message applies to each window independently. In some examples, the persistence of the nested SEI messages may be ignored and the persistence can be specified by one or more syntax elements signaled, or specified by the semantics, within the nesting SEI message.

TABLE 1

Persistence of Nested SEI Messages

| SEI message | Persistence scope |
|---|---|
| Film grain characteristics | Specified by the syntax of the SEI message |
| Post-filter hint | The access unit containing the SEI message |
| Tone mapping information | Specified by the syntax of the SEI message |
| Chroma resampling filter hint | The CLVS containing the SEI message |
| Knee function information | Specified by the syntax of the SEI message |
| Color remapping information | Specified by the syntax of the SEI message |

In some implementations, the device can generate the regional nesting SEI message 350 to include a syntax element specifying that certain other syntax elements are explicitly signaled. For example, the syntax element may indicate that the syntax elements associated with the application to which one or more nested SEI messages (nested SEI messages 352, 353) apply, the syntax elements associated with the target system, or the syntax elements relating to the application and the target system are explicitly signaled in the regional nesting SEI message 350. An example of such a syntax element is shown below (e.g., as rns_info_present_flag). For example, the regional nesting SEI message 350 can signal syntax elements related to the application to which the nested SEI messages (nested SEI messages 352, 353) or metadata sets (e.g., metadata 357, 359) are applicable. In some cases, these syntax elements can include an application identifier and an application version. As another example, the regional nesting SEI message 350 can signal syntax elements related to the target system to which the nested SEI messages or metadata sets are applicable. In some cases, these syntax elements can include the display primaries associated with the target system and the corresponding white point coordinates. In some cases, these syntax elements can include the minimum and the maximum luminance associated with the target display.

In some implementations, the device can generate the regional nesting SEI message 350 to signal a subset region within each applicable region of each nested SEI message (e.g., nested SEI messages 352, 353) or metadata sets (e.g., metadata 357, 359). In some examples, the device can signal a syntax element in the regional nesting SEI message 350 that specifies the domain in which the subset region is specified. For example, one value of the syntax element (e.g., a 0 or 1) may specify that the domain is YCbCr, and another value (e.g., a 1 or 0) may specify that the domain is spatial domain. In some examples, the device can signal or derive a number of ranges or boundaries specified for the applicable region. In some examples, the device can signal a syntax element that specifies that type of range or boundary specified. For example, one syntax element may specify that a lower bound and an upper bound are specified. In another example, another syntax element or value may specify that a circular disk is specified. In another example, a further value of the syntax element may be specify that an elliptical region is specified. In some examples, the device can signal or derive a number of values associated with each range or boundary time, and can signal those values. In some examples, the device can signal a flag that indicates whether the subset region within the applicable region to which the nested SEI message is applied to is within the range or boundary specified or outside of the range/boundary specified.

Figure 5:
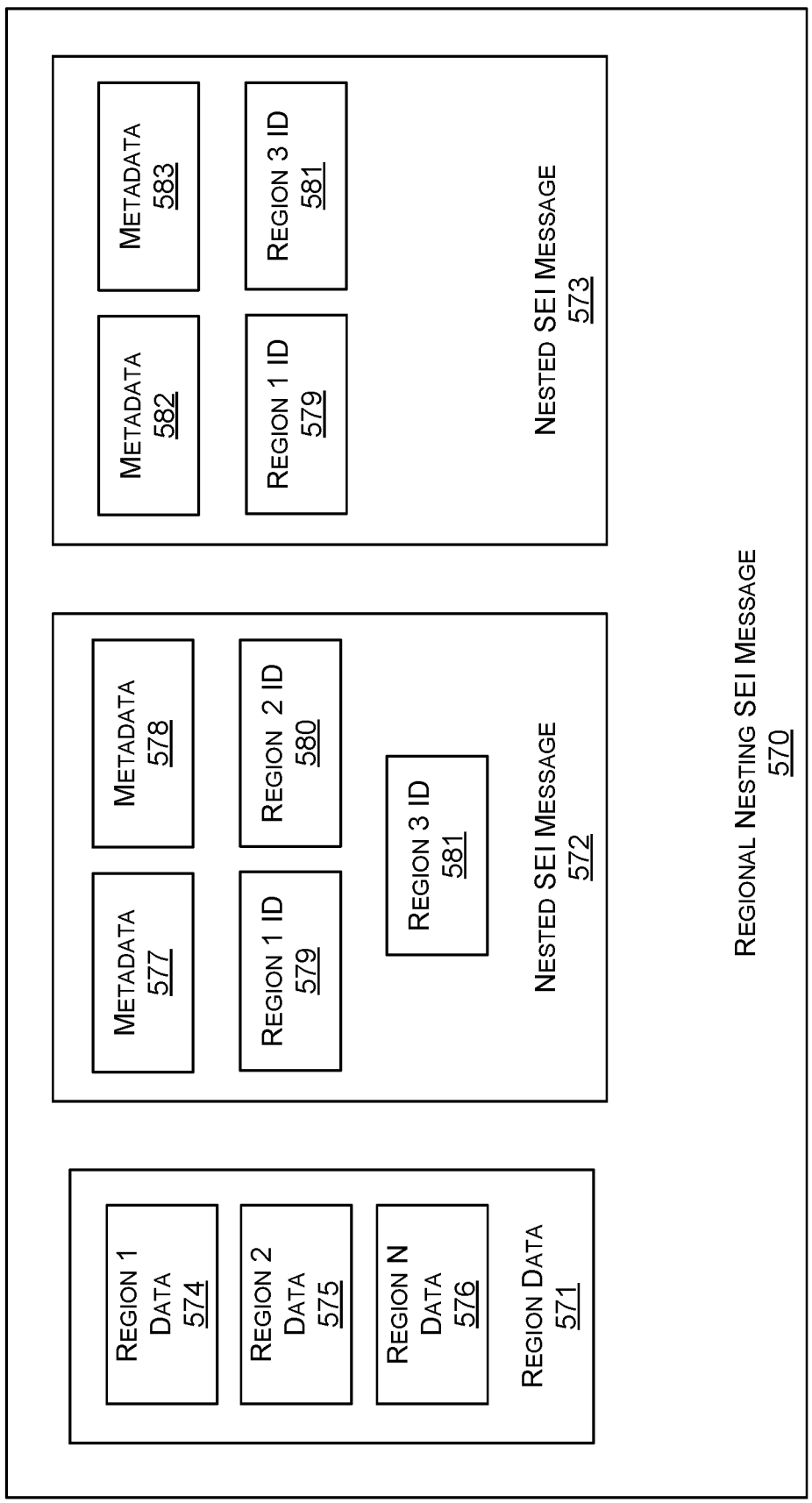
FIG. 5 is a diagram illustrating another example of a regional nesting SEI message, in accordance with some examples.

FIG. 5 is a diagram illustrating another example of a regional nesting SEI message 570 generated for a picture of a video bitstream. The regional nesting SEI message 570 can be generated by a device, such as the encoding device 104 or other device that can store or transmit the regional nesting SEI message 570 in or with a video bitstream to a receiving device, such as the decoding device 112 or other device that can decode or otherwise process the regional nesting SEI message 570.

The regional nesting SEI message 570 is similar to the regional nesting SEI message 350, and includes region data 571 defining multiple regions in the picture and also multiple nested SEI messages 572 and 573. The region data 571 is similar to the region data 351, and includes region 1 data 574, region 2 data 575, through region N data 576. All of the examples described above with respect to the regional nesting SEI message 350 are applicable to the regional nesting SEI message 570.

The regional nesting SEI message 570 contains multiple nested messages 572 and 573 that are be applicable to at least one common region in the same picture. The nested SEI message 572 includes a type indicating the purpose for which the nested SEI message 572 is to be applied. For example, the nested SEI message 572 can be used for converting from a first dynamic range to a second dynamic range, in which case the nested SEI message 572 can be a CRI SEI message. The nested SEI message 572 includes multiple sets of data and multiple region identifiers (IDs). The sets of data include metadata 577 and metadata 578 that can both be used for the identified purpose (e.g., conversion from HDR to SDR, or other purpose) on different regions of the picture. For example, metadata 577 and metadata 578 can include different values of metadata that is used for the purpose of the nested SEI message 572 (e.g., HDR to SDR conversion, or other purpose). One of ordinary skill will appreciate that the nested SEI message 572 can include more than two sets of metadata and more than three region IDs.

The one or more regions for which each set of metadata 577 and 578 is applicable are identified by the region IDs, including region 1 ID 579, region 2 ID 580, and region 3 ID 581. The different region IDs 579, 580, 581 can be mapped to one or both of the sets of metadata 577, 578. For example, the metadata 577 can be mapped to or associated with both the region 1 ID 579 and the region 2 ID 580, indicating to the decoder or other device that the metadata 577 is to be applied to both the first region (identified by the region 1 ID 579 and defined by the region 1 data 574) and the second region (identified by the region 2 ID 580 and defined by the region 2 data 575). The metadata 578 can be mapped to or associated with the region 3 ID 581, indicating that the metadata 578 is to be applied to the third region (identified by the region 3 ID 581 and defined by the region data 571). For example, the metadata 577 can include a first version of metadata of a CRI SEI message that is applicable to video having certain characteristics (e.g., color characteristics), and the first and second regions can include samples having the certain characteristics. In this example, the metadata 578 can be a second version of the metadata of the CRI SEI message that is applicable video having different characteristics, and the third region can include samples having the different characteristics.

The other nested SEI message 573 includes a different type than the nested SEI message 572, which indicates the purpose for which the nested SEI message 573 is to be applied. For example, the nested SEI message 573 can be used for filtering decoded video pictures, for performing tone mapping, or for another suitable purpose that is applicable on a region-specific basis. The nested SEI message 573 includes metadata 582 and metadata 583 and the region 1 ID 579 and the region 3 ID 581. One of ordinary skill will appreciate that the nested SEI message 573 can include more than two sets of metadata and more than two region IDs.

The metadata 582 and metadata 583 can both be used for the identified purpose of the nested SEI message 573 (e.g., decoded picture filtering, or other purpose) on different regions of the picture. For example, metadata 582 and metadata 583 can include different values of metadata that is used for the purpose (e.g., decoded picture filtering, or other purpose). The one or more regions for which each sets of metadata 582 and 583 are applicable are identified by the region IDs, including the region 1 ID 579 and the region 3 ID 581. The metadata 582 can be mapped to or associated with the region 1 ID 579, indicating to the decoder or other device that the metadata 582 is to be applied to the first region (identified by the region 1 ID 579 and defined by the region 1 data 574). The metadata 583 can be mapped to or associated with the region 3 ID 581, indicating that the metadata 583 is to be applied to the third region (identified by the region 3 ID 581 and defined by the region data 571).

As shown in FIG. 5, the regional nesting SEI message 570 allows a defined region (e.g., the first region defined by region 1 data 574 and the third region defined by other region data in the region data 571 that is not shown) to be shared by multiple nested SEI messages, without re-defining the region for each nested SEI message. For example, the purposes or applications of the two nested SEI messages 572 and 573 may define or use similar or the same regions. Instead of re-defining the regions twice for both of the nested SEI messages 572 and 573, the nested SEI messages 572 and 573 can include pointers to the region data 571 by including the region 1 ID 579 and the region 3 ID 581.

Figure 6:
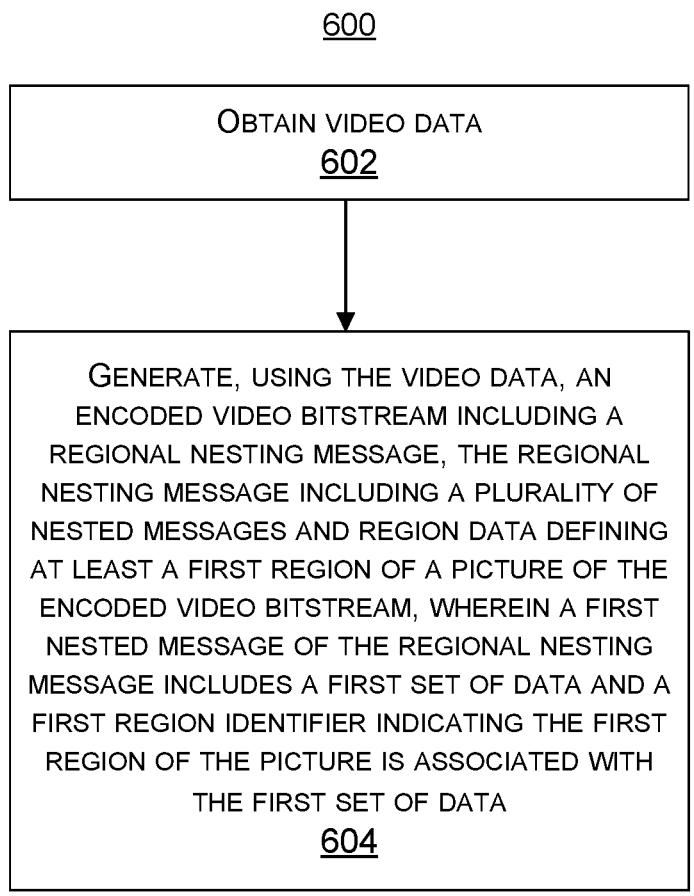
FIG. 6 illustrates a flowchart illustrating an example of a process of encoding video data, in accordance with some examples.

FIG. 6 is a flowchart illustrating an example of a process 600 of encoding video data using one or more of the techniques described herein. At block 602, the process 600 includes obtaining the video data. For example, the video data can include pictures captured using a camera of a device. In another example, the video data can be obtained from a storage device.

At block 604, the process 600 includes generating, using the video data, an encoded video bitstream. The encoded video bitstream can be generated using the coding techniques described herein. The encoded video bitstream includes a regional nesting message that includes a plurality of nested messages and a plurality of region data defining a plurality of regions of a picture of the encoded video bitstream. A first nested message of the regional nesting message includes a first set of data and a first region identifier indicating that the first set of data is to be applied to a first region of the plurality of regions of the picture.

In some implementations, the regional nesting message is a regional nesting supplemental enhancement information (SEI) message, and the plurality of nested messages are nested SEI messages. An example of the regional nesting message is the regional nesting SEI message 350 shown in FIG. 3. Another example of the regional nesting message is the regional nesting SEI message 570 shown in FIG. 5.

In some examples, the first set of data is used to perform a first function on the first region based on the first region identifier. The set of data can define any suitable function, such as the functions performed using the film grain characteristics SEI message, the tone mapping information SEI message, the post filter hint SEI message, the chroma resampling filter hint SEI message, the color remapping information SEI message, the knee function information SEI message, or any other suitable data used to perform a function on a region of a video picture.

In some aspects, the first set of data specifies a characteristic of the first region based on the first region identifier. For example, the first set of data can include information about the maximum luminance of the content of the first region, the minimum luminance of the content of the first region, a color characteristic of the content of the first region, or other characteristic of the region content. In another example, the first set of data can include hints that a decoder device, a player device, a display device, or other device can use to process the content of the first region according the constraints of the device or to the conditions under which the device operates.

In some aspects, region data defining a region of the plurality of regions of the picture is included once in the regional nesting message. In such cases, regions do not have to be re-defined for each nested message, such that region data does not have to be signaled individually for each nested message or for each set of data that is to be applied to a picture.

In some examples, the first nested message further includes a second set of data, and the second set of data is associated with the first region identifier to indicate that the second set of data is to be applied to the first region.

In some examples, the first set of data of the first nested message is applicable to multiple regions of the plurality of regions of the picture. In some cases, the first nested message further includes a second region identifier indicating that the first set of data is to be applied to a second region of the plurality of regions of the picture. In such cases, the first set of data is independently applicable to each of the first region and the second region.

In some examples, the regional nesting message includes a second nested message, and the second nested message includes a second set of data associated with the first region identifier, thus indicating that the second set of data is to be applied to the first region. In such examples, the first set of data and the second set of data is to be applied to the first region (e.g., by a decoder device, a player devices, a display device, or other suitable device). The region data for the first region only has to be included once for the regional nesting message, and the first identifier can be associated with the first and second sets of data to indicate that both sets of data are to be applied to the first region.

In some aspects, the regional nesting message further includes a number of the plurality of regions of the picture.

In some examples, the plurality of region data define boundaries of the plurality of regions or define samples contained in each of the plurality of regions. In some examples, the plurality of region data define offsets of boundaries of the plurality of regions from boundaries of the picture. In some examples, the plurality of region data define the plurality of regions as rectangular regions.

In some implementations, when a sample of the picture is in two or more regions of the picture, a nested message of a first type that is applicable to a region of the two or more regions that has a largest region identifier value from among the two or more regions is applicable to the sample. In some cases, another nested message of the first type applicable to another region of the two or more regions that does not have the largest region identifier value from among the two or more regions is not applicable to the sample.

In some examples, the regional nesting message further includes a syntax element identifying a purpose of the regional nesting message. In some cases, the regional nesting message further includes a number of the plurality of nested messages in the regional nesting message.

In some examples, a nested message of the plurality of nested messages has a same persistence as if the nested message was not nested in the regional nesting message. For example, the persistence of a nested message may not be changed when it is added to a regional nesting message.

In some examples, the regional nesting message includes a set of indices for the first nested message. The set of indices indicates one or more regions for which the first set of data is to be applied. For example, the set of indices can include at least the first region identifier.

Figure 7:
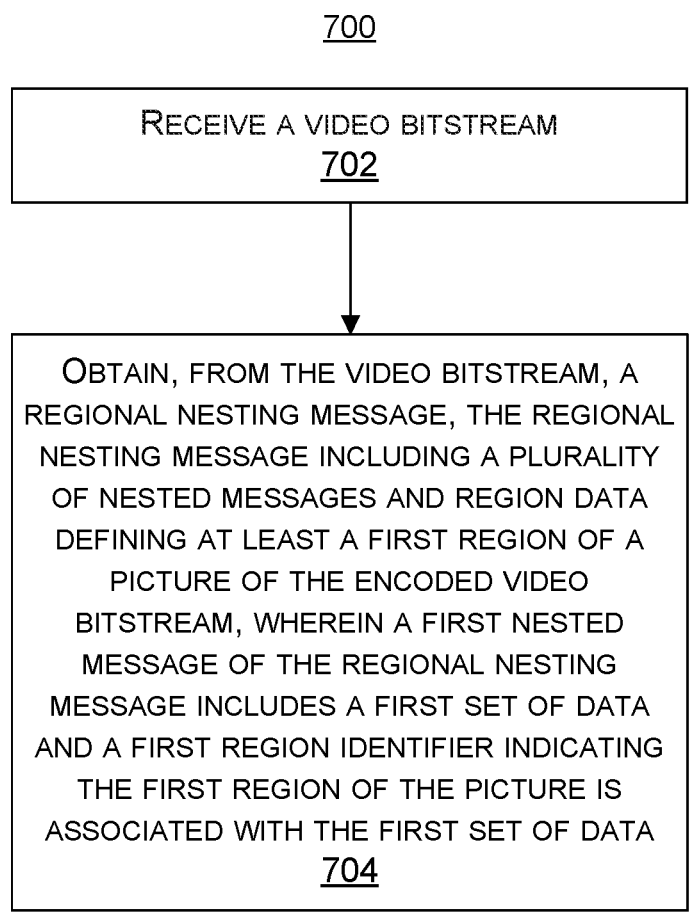
FIG. 7 illustrates a flowchart illustrating an example of a process of decoding video data, in accordance with some examples.

FIG. 7 is a flowchart illustrating an example of a process 700 of decoding video data using one or more of the techniques described herein. At 702, the process 700 includes receiving a video bitstream. The video bitstream can include a plurality of encoded pictures and syntax elements and variables with information can be used for decoding the pictures and processing the decoded pictures.

At block 704, the process 700 includes obtaining, from the video bitstream, a regional nesting message. The regional nesting message includes a plurality of nested messages and a plurality of region data defining a plurality of regions of a picture of the encoded video bitstream. A first nested message of the regional nesting message includes a first set of data and a first region identifier indicating that the first set of data is to be applied to a first region of the plurality of regions of the picture.

In some examples, the first set of data is used to perform a first function on the first region based on the first region identifier. The set of data can define any suitable function, such as the functions performed using the film grain characteristics SEI message, the tone mapping information SEI message, the post filter hint SEI message, the chroma resampling filter hint SEI message, the color remapping information SEI message, the knee function information SEI message, or any other suitable data used to perform a function on a region of a video picture.

The process 700 (when performed by a decoding device) can also include decoding the picture and performing the first function on the first region of the picture using the first set of data. The first function is performed on the first region based on the first region identifier. The picture (and other pictures of the video bitstream) can be decoded using the coding techniques described herein.

In some examples, the first set of data specifies a characteristic of the first region based on the first region identifier. For example, the first set of data can include information about the maximum luminance of the content of the first region, the minimum luminance of the content of the first region, a color characteristic of the content of the first region, or other characteristic of the region content. In another example, the first set of data can include hints that a decoder device, a player device, a display device, or other device can use to process the content of the first region according the constraints of the device or to the conditions under which the device operates.

In some implementations, the regional nesting message is a regional nesting supplemental enhancement information (SEI) message, and the plurality of nested messages are nested SEI messages. An example of the regional nesting message is the regional nesting SEI message 350 shown in FIG. 3. Another example of the regional nesting message is the regional nesting SEI message 570 shown in FIG. 5.

In some aspects, region data defining a region of the plurality of regions of the picture is included once in the regional nesting message. In such cases, regions do not have to be re-defined for each nested message, such that region data does not have to be signaled individually for each nested message or for each set of data that is to be applied to a picture.

In some examples, the first nested message further includes a second set of data, and the second set of data is associated with the first region identifier to indicate that the second set of data is to be applied to the first region.

In some examples, the first set of data of the first nested message is applicable to multiple regions of the plurality of regions of the picture. In some cases, the first nested message further includes a second region identifier indicating that the first set of data is to be applied to a second region of the plurality of regions of the picture. In such cases, the first set of data is independently applicable to each of the first region and the second region.

In some examples, the regional nesting message includes a second nested message, and the second nested message includes a second set of data associated with the first region identifier, thus indicating that the second set of data is to be applied to the first region. In such examples, the first set of data and the second set of data is to be applied to the first region (e.g., by a decoder device, a player devices, a display device, or other suitable device). The region data for the first region only has to be included once for the regional nesting message, and the first identifier can be associated with the first and second sets of data to indicate that both sets of data are to be applied to the first region.

In some aspects, the regional nesting message further includes a number of the plurality of regions of the picture.

In some examples, the plurality of region data define boundaries of the plurality of regions or define samples contained in each of the plurality of regions. In some examples, the plurality of region data define offsets of boundaries of the plurality of regions from boundaries of the picture. In some examples, the plurality of region data define the plurality of regions as rectangular regions.

In some implementations, when a sample of the picture is in two or more regions of the picture, a nested message of a first type that is applicable to a region of the two or more regions that has a largest region identifier value from among the two or more regions is applicable to the sample. In some cases, another nested message of the first type applicable to another region of the two or more regions that does not have the largest region identifier value from among the two or more regions is not applicable to the sample.

In some examples, the regional nesting message further includes a syntax element identifying a purpose of the regional nesting message. In some cases, the regional nesting message further includes a number of the plurality of nested messages in the regional nesting message.

In some examples, a nested message of the plurality of nested messages has a same persistence as if the nested message was not nested in the regional nesting message. For example, the persistence of a nested message may not be changed when it is added to a regional nesting message.

In some examples, the regional nesting message includes a set of indices for the first nested message. The set of indices indicates one or more regions for which the first set of data is to be applied. For example, the set of indices can include at least the first region identifier.

In some examples, the processes 600 and 700 may be performed by a computing device or an apparatus, such as the system 100 shown in FIG. 1. For example, the process 600 can be performed by the encoding device 104 shown in FIG. 1 and FIG. 8, or by another video source-side device or video transmission device. The process 700 can be performed by the decoding device 112 shown in FIG. 1 and FIG. 9 or by another client-side device, such as a player device, a display, or any other client-side device. In some cases, the computing device or apparatus may include a processor, microprocessor, microcomputer, or other component of a device that is configured to carry out the steps of processes 600 and 700. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

Processes 600 and 700 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 600 and 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Various illustrative embodiments are described providing examples of the above-described techniques. The embodiments are shown as additions and deletions of syntax elements, variables, semantics, and other portions of the Standard (an example of which is included in Standard Document JCTVC-Z1005). Addition to the syntax and semantics of the Standard are indicated in between "<insert>" and "<insertend>" symbols (e.g., "<insert>added text<insertend>") for Embodiment 1. For subsequent Embodiments 2-6, addition of syntax elements with respect to Embodiment 1 is shown in between "<insert>" and "<insertend>" symbols (e.g., "<insert>added text<insertend>"), and deletions are shown in between "<delete>" and "<deleteend>" symbols (e.g., "<delete>added text<deleteend>").

Embodiment 1

In this embodiment, the regions of the picture and the SEI messages and the associated metadata are signalled through an SEI message—regional nesting SEI message.

SEI Payload Syntax Structure

|  | Descriptor |
| --- | --- |
| sei_payload( payloadType, payloadSize ) { | |
|   if( nal_unit_type == PREFIX_SEI_NUT ) | |
|     if( payloadType == 0 ) | |
|   ... | |
|   <insert> else if( payloadType == 147 ) | |
|     regional_nesting( payloadSize )<insertend> | |
|   ... | |

The payloadType value for the regional nesting SEI message may be set to a different value based on the other SEI message in the HEVC specification.

Regional Nesting SEI Message Syntax Structure

|  | Descriptor |
| --- | --- |
| <insert> regional_nesting( payloadSize ) { | |
|   rns_id | u(16) |
|   rns_region_size_type_idc | ue(v) |
|   rns_num_rect_regions | ue(v) |
|   for( i = 0; i < rns_num_rect_regions; i++ ) { | |
|     rns_rect_region_id[ i ] | u(32) |
|     rns_rect_region_left_top_x[ i ] | u(16) |
|     rns_rect_region_left_top_y[ i ] | u(16) |
|     rns_rect_region_bottom_right_x[ i ] | u(16) |
|     rns_rect_region_bottom_right_y[ i ] | u(16) |
|   } | |
|   num_seis_in_rns_minus1 | ue(v) |
|   while( !byte_aligned( )) | |
|     regional_nesting_zero_bit /* equal to 0 */ | u(1) |
|   for( i = 0; i <= num_seis_in_rns_minus1; i++ ) { | |
|     sei_message( ) | |
|     rns_num_data_bytes[ i ] | u(8) |
|     for( j = 0; j < rns_num_data_bytes[ i ]; j++ ) | |
|       rns_data_byte[ i ][ j ] | u(8) |
|   } | |
| }<insertend> | |

Regional Nesting SEI Message Semantics

The regional nesting SEI message provides a mechanism to associate SEI messages with regions of the picture, which are specified in the SEI message.

A regional nesting SEI message contains one or more SEI messages. When an SEI message is nested in a regional nesting SEI message, the semantics of the SEI message are to be interpreted as to be independently applicable to each region specified in the SEI message. When a particular sample in the current picture is present in more than one region specified by regional nesting SEI messages associated with the current picture, the SEI message that is applied to the particular sample may be determined by other syntax elements in the SEI message or by means outside of this Specification. Each nested SEI message has the same persistence scope as if the SEI message was not nested.

It is a requirement of bitstream conformance that the following restrictions apply on nesting of SEI messages in a regional nesting SEI message:

An SEI message that has payloadType equal to 0 (buffering period), 1 (picture timing), 2 (pan scan), 3 (filler payload), 4 (user data registered), 5 (user data unregistered), 6 (recovery point), 9 (scene information), 15 (picture snapshot), 16 (progressive refinement segment start), 17 (progressive refinement segment end), 45 (frame packing arrangement), 47 (display orientation), 56 (green metadata), 128 (structure of pictures), 129 (active parameter sets), 130 (decoding unit information), 131 (temporal sub-layer zero index) 132 (decoded picture hash), 133 (scalable nesting), 134 (region refresh), 135 (no display), 136 (time code), 137 (mastering display color volume), 138 (segmented rectangular frame packing), 139 (temporal motion constrained tile sets), 143 (deinterlaced field), 144 (content light level), 145 (dependent RAP), 146 (coded region), 160 (layers not present), 161 (inter layer constrained tile sets), 162 (bsp nesting), 163 (bsp initial arrival time), 164 (sub bitstream property), 165 (alpha channel info), 166 (overlay info), 167 (temporal mv prediction), 168 (frame field info), 176 (three dimensions reference displays), 177 (depth representation info), 178 (multiview scene), 179 (multiview acquisition), 180 (multiview view position), 181 (alternative depth), 182 (alternative characteristics), and 183 (ambient viewing environment) shall not be nested in a regional nesting SEI message. [Ed. (AR): This currently includes all except film grain characteristics, post filter hint, tone mapping information, resampling filter hint and chroma remapping information SEI messages.]

NOTE—Unlike the scalable nesting SEI message, the SEI messages nested in the regional nesting SEI message should not be extracted and sent as a separate SEI message as the values signalled in the nested SEI message may not be applicable outside the applicable regions.

rns_id contains an identifying number that may be used to identify the purpose of the one or more regional nesting SEI messages. The value of rns_id shall be in the range of 0 to $2^{32}-2$, inclusive.

Values of rns_id from 0 to 255 and from 512 to $2^{31}-1$ may be used as determined by the application. Values of rns_id from 256 to 511 and from $2^{31}$ to $2^{32}-2$ are reserved for future use by ITU-T ISO/IEC. Decoders encountering a value of rns_id in the range of 256 to 511, inclusive, or in the range of $2^{31}$ to $2^{32}-2$, inclusive, shall ignore it.

rns_region_size_type_idc specifies the units in which the boundaries of the regional are specified in the SEI message. When rns_region_size_type_idc is equal to 0, the syntax elements rns_region_left_top_[ ] rns_region_left_top_y[ ], rns_region_bottom_right_x[ ], and rns_region_bottom_right_y[ ] are in units of samples. When rns_region_size_type_idc is equal to 1, the syntax elements ms region left top_[ ] rns_region_left_top y[ ], rns_region_bottom_right_x[ ], and rns_region_bottom_right_y[ ] are in units of CTUs. When rns_region_size_type_idc is equal to 2, the syntax elements rns_region_left_top_[ ] rns_region_left_top y[ ], rns_region_bottom_right_x[ ], and rns_region_bottom_right_y[ ] are specified in units of tiles.

rns_num_rect_regions specifies the number of rectangular regions specified by the SEI message. The value of rns_num_rect_regions shall be in the range of 1 to 255, inclusive. The value of rns_num_rect_regions equal to 0 is reserved for future use by ITU-T ISO/IEC.

rns_rect_region_id[i] indicates an identifier for the i-th rectangular region specified in the SEI message.

Unless indicated otherwise by some means not specified in this Specification, when a sample belongs to more than one rectangular region, the SEI messages that are associated with the region that has the greatest value of rns_rect_region_id[ ] and includes the sample are applicable to the sample.

NOTE—The rns_rect_region_id[i] may be used as a priority number that is used to indicate the metadata parameters corresponding to which region should be applied when more than one region associated with different sets of metadata is applicable for a give sample or region of the picture.

In some alternatives, the value of rns_rect_region_id[i] is restricted to be unique for each region that is specified in the one or more regional nesting SEI messages associated with the current picture. When the values of rns_rect_region_id[i] is equal for two regions that are specified in one or more regional nesting SEI messages associated with the current picture, it may be required that the values of subset of the syntax elements associated the boundary of the regions are restricted to be equal. In some alternatives, the subset of syntax elements may include the syntax elements ms region left top_[ ] rns_region_left_top y[ ], rns_region_bottom_right_x[ ], and ms region bottom right y[ ]. For instance, a following constraint may be added:

When the value of rns_rect_region_id[i] is equal for any two regions that are specified in one or more regional nesting SEI messages applicable to the current picture, it is a requirement of bitstream conformance that the values of ms region left top_[ ] rns_region_left_top_y[ ], rns_region_bottom_right_x[ ], and rns_region_bottom_right_y[ ] be equal.

rns_rect_region_left_top_x[i] specifies the horizontal coordinate of the top-left unit of the i-th rectangular region specified in the SEI message. The unit in which rns_rect_region_left_top_x[i] is defined is specified by the rns_region_size_type_idc syntax element.

rns_rect_region_left_top_y[i] specifies the vertical coordinate of the top-left unit of the i-th rectangular region specified in the SEI message. The unit in which rns_rect_region_left_top_y[i] is defined is specified by the rns_region_size_type_idc syntax element.

rns_rect_region_bottom_right_x[i] specifies the horizontal coordinate of the bottom-right unit of the i-th rectangular region specified in the SEI message. The unit in which rns_rect_region_bottom_right_x[i] is defined is specified by the rns_region_size_type_idc syntax element.

rns_rect_region_bottom_right_y[i] specifies the vertical coordinate of the bottom-right unit of the i-th rectangular region specified in the SEI message. The unit in which rns_rect_region_bottom_right_y[i] is defined is specified by the rns_region_size_type_idc syntax element.

num_seis_in_rns_minus1 plus 1 specifies the number of SEI messages specified in the SEI message. The value of num_seis_in_rns_minus1 shall be in the range of 0 to 255, inclusive.

regional_nesting_zero_bit shall be equal to 0.

rns_num_data_bytes[i] specifies the number of bytes of data signalled by instances of rns_data_byte[i][j] immediately after the syntax element rns_num_data_bytes[i]. The value of rns_num_data_bytes[i] shall be in the range of 0 to 255, inclusive.

rns_data_byte[i][j] may have any value. Unless specified otherwise by means not in this Specification, decoders shall ignore the value of rns_data_byte[i][j]. In an alternative, one or more of the following constraints may be added to the semantics of the regional nesting SEI message:

When the value of tiles_enabled_flag is equal to 0 for a PPS that is associated with the current picture, a regional nesting SEI message with value of rns_region_size_type_idc equal to 2 shall not be associated with the current picture.

In another alternative, the persistence of the nested SEI messages are overridden, and instead a syntax element is signalled in the regional nesting SEI message to indicate end of persistence of the regional nesting SEI message and the contents within. The end of persistence may be specified for a subset of the regions or for a subset of the nested SEI messages.

In another alternative, the value range of the syntax element rns_num_rect_regions is specified to be dependent on the syntax element rns_region_size_type_idc.

In another alternative, a first syntax element is signalled to indicate the shape of the regions specified in the regional nesting SEI messages, and the syntax elements associated with rectangular regions may be signalled depending on the value of the first syntax element.

In another alternative, the syntax element rns_num_rect_regions is moved before the syntax element and rns_region_size_type_idc in present only when rns_num_rect_regions is greater than 0.

Embodiment 2

In this embodiment, the syntax is similar to that in Embodiment 1, except that the rns_num_data_bytes and rns_data_byte syntax elements are signalled outside the loop of SEI messages.

| | Descriptor |
|---|---|
| regional_nesting( payloadSize ) { | |
|   rns_region_size_type_idc | ue(v) |
|   rns_num_rect_regions | ue(v) |
|   for( i = 0; i < rns_num_rect_regions; i++ ) { | |
|     rns_rect_region_id[ i ] | u(32) |
|     rns_rect_region_left_top_x[ i ] | u(16) |
|     rns_rect_region_left_top_y[ i ] | u(16) |
|     rns_rect_region_bottom_right_x[ i ] | u(16) |
|     rns_rect_region_bottom_right_y[ i ] | u(16) |
|   } | |
| <insert> rns_num_data_bytes | u(8) |
|   for( i = 0; i < rns_num_data_bytes; i++ ) | |
|     rns_data_byte<insertend> | u(8) |
|   num_seis_in_rns_minus1 | ue(v) |
|   while( !byte_aligned( )) | |
|     regional_nesting_zero_bit /* equal to 0 */ | u(1) |
|   for( i = 0; i <= num_seis_in_rns_minus1; i++) | |
|     sei_message( ) | |
| <delete>rns_num_data_bytes[ i ] | u(8) |
|     for( i = 0; i < rns_num_data_bytes[ i ]; i++ ) | |
|       rns_data_byte | u(8) |
|   }<deleteend> | |
| } | | rns_num_data_bytes specifies the number of bytes of data signalled as rns_data_byte immediately after the syntax element rns_num_data_bytes. The value of rns_num_data_bytes shall be in the range of 0 to 255, inclusive.

The semantics of the rest of the syntax elements remains the same as defined in Embodiment 1.

In one alternative, the syntax element rns_num_data_bytes is coded as a ue(v) element, or with a fixed number of bits that is specified in the bitstream or by means outside of the bitstream.

Embodiment 3

In this embodiment, the syntax structure is similar to that in Embodiment 1, where the rns_data_byte may not be signalled, and information related to the targeted display system and the application associated with the SEI messages nested is signalled.

| | Descriptor |
|---|---|
| regional_nesting( payloadSize ) { | |
|   rns_region_size_type_idc | ue(v) |
|   ... | |
| <delete>rns_num_data_bytes | u(8) |
|   for( i = 0; i < rns_num_data_bytes; i++ ) | |
|     rns_data_byte<deleteend> | u(8) |
| <insert> rns_info_present_flag | u(1) |
|   if( rns_info_present_flag ) { | |
|     application_identifier | u(8) |
|     application_version | u(8) |
|     for( c = 0; c < 4; c++ ) { | |
|       targeted_system_prim_chromaticity_x[ c ] | u(16) |
| | Descriptor |
|---|---|
|       targeted_system_prim_chromaticity_y[ c ] | u(16) |
|     } | |
|     targeted_display_max_luminance | u(16) |
|     targeted_display_min_luminance | u(16) |
|   }<insertend> | |
|   num_seis_in_rns_minus1 | ue(v) |
|   while( !byte_aligned( )) | |
|     regional_nesting_zero_bit /* equal to 0 */ | u(1) |
|   for( i = 0; i <= num_seis_in_rns_minus1; i++ ) | |
|     sei_message( ) | |
| } | | rns_info_present_flag equal to 1 specifies that the syntax elements application_identifier, application_version, targeted_system_prim_chromaticity_x[ ], targeted_system_prim_chromaticity_y[ ], targeted_display_max_luminance, and targeted_display_min_luminance are explicitly signalled. target_sytem_info_present_flag equal to 0 specifies that the syntax elements application_identifier, application_version, targeted_system_prim_chromaticity_x[ ], targeted_system_prim_chromaticity_y[ ], targeted_display_max_luminance, and targeted_display_min_luminance are not explicitly signalled and that the values of these syntax elements are not specified.

application_identifier is an identifier that may be used to identify the SEI messages. application_identifier is an integer in the range of 0 to 255, inclusive.

application_version indicates the version associated with the SEI messages. application_version shall be in the range of 0 to 255, inclusive.

targeted_system_prim_chromaticity_x[c] and targeted_system_prim_chromaticity_y[c] for c in the range of 0 to 2, inclusive, are used to specify the primaries of the targeted display in units of 0.0001.

targeted_system_prim_chromaticity_x[4] and targeted_system_prim_chromaticity_y[4] are used to specify the white point chromaticity of the targeted display in units of 0.0001.

targeted_display_max_luminance is used to derive the maximum luminance of the targeted display corresponding to the SEI message. The value of targeted_display_max_luminance is specified in units of 0.01 candela per meter square.

targeted_display_min_luminance is used to derive the minimum luminance of the targeted display corresponding to the SEI message. The value of targeted_display_min_luminance is specified in units of 0.0001 candela per meter square.

The semantics of the rest of the syntax elements remains the same as defined in Embodiment 1.

In one alternative, the syntax element rns_info_present_flag may not be signalled and the syntax element rns_num_data_bytes may be signalled, and the presence of the syntax elements application_identifier, application_version, targeted_system_prim_chromaticity_x[ ], targeted_system_prim_chromaticity_y[ ], targeted_display_max_luminance, and targeted_display_min_luminance may be dependent on the value of rns_num_data_bytes.

In another alternative, the syntax element application_identifier, application_version, targeted_system_prim_chromaticity_x[ ], targeted_system_prim_chromaticity_y[ ], targeted_display_max_luminance, and targeted display min luminance may be signalled inside the loop containing the SEI messages as follows, in which case the syntax elements in the i-th iteration of the loop are associated with the i-th SEI message.

| | Descriptor |
|---|---|
| regional_nesting( payloadSize ) { | |
|     rns_region_size_type_idc | ue(v) |
|     rns_num_rect_regions | ue(v) |
|     for( i = 0; i < rns_num_rect_regions; i++) { | |
|         rns_rect_region_id[ i ] | u(32) |
|         rns_rect_region_left_top_x[ i ] | u(16) |
|         rns_rect_region_left_top_y[ i ] | u(16) |
|         rns_rect_region_bottom_right_x[ i ] | u(16) |
|         rns_rect_region_bottom_right_y[ i ] | u(16) |
|     } | |
|     num_seis_in_rns_minus1 | ue(v) |
|     while( !byte_aligned( )) | |
|         regional_nesting_zero_bit /* equal to 0 */ | u(1) |
|     for( i = 0; i <= num_seis_in_rns_minus1; i++ ) { | |
|         sei_message( ) | |
| <delete>        rns_num_data_bytes[ i ] | u(8) |
|         for( i = 0; i < rns_num_data_bytes[ i ]; i++ ) | |
|             rns_data_byte<deleteend> | u(8) |
| <insert>        rns_info_present_flag[ i ] | u(1) |
|         if( rns_info_present_flag ) | |
|             application_identifier[ i ] | u(8) |
|             application_version[ i ] | u(8) |
|             for( c = 0; c < 4; c++ ) { | |
|                 targeted_system_prim_chromaticity_x[ i ][ c ] | u(16) |
|                 targeted_system_prim_chromaticity_y[ i ][ c ] | u(16) |
|             } | |
|             targeted_display_max_luminance[ i ] | u(16) |
|             targeted_display_min_luminance[ i ] | u(16) |
|     }<insertend> | |
|     } | |
| } | |

Embodiment 4

In this embodiment, an index to the list of regions is signaled for each iteration of the loop of SEI messages, and the index associated with the iteration is used to specify the region to which the SEI message and any metadata signalled in that iteration is applicable.

| | Descriptor |
|---|---|
| regional_nesting( payloadSize ) { | |
|     rns_region_size_type_idc | ue(v) |
| ... | |
|     num_seis_in_rns_minus1 | ue(v) |
| <delete>while( !byte_aligned( )) | |
|     regional_nesting_zero_bit /* equal to 0 */<deleteend> | u(1) |
|     for( i = 0; i <= num_seis_in_rns_minus1; i++ ) { | |
| <insert>        wns_num_applicable_regions[ i ] | ue(v) |
|         for( j = 0; j < wns_num_applicable_regions; j++) | |
|         { | |
|             wns_applicable_region_idx[ i ][ j ] | u(v) |
|         while( !byte_aligned( )) | |
|             regional_nesting_zero_bit /* equal to 0 */<insertend> | u(1) |
|         sei_message( ) | |
|         rns_num_data_bytes[ i ] | u(8) |
|         for( i = 0; i < rns_num_data_bytes[ i ]; i++ ) | |
|             rns_data_byte | u(8) |
|     } | |
| } | | wns_num_applicable_regions_minus1[i] plus 1 specifies the number of regions for which the SEI message and metadata signalled in the i-th iteration is applicable among the set of regions specified in the SEI message. The value of wns_num_applicable_regions_minus1[i] shall be in the range of 0 to wns_num_rect_regions−1, inclusive.

wns_applicable_region_idx[i][j] specifies the index of j-th region that is applicable to the i-th SEI message or syntax structure. The number of bits used to represent wns_applicable_region_idx[i][j] is equal to Ceil(Log 2(wns_num_region_minus1+1)).

Embodiment 5

This embodiment is similar to Embodiment 4, where for each applicable region, a subset region is signalled to indicate the subset of the applicable region to which the corresponding SEI message and metadata are applicable. In this embodiment, a region specified in the SEI message is also referred to as a window, and a sample is also referred to as a pixel. An example of signaling such a subset regions is as follows:

| | Descriptor |
|---|---|
| regional_nesting( payloadSize ) { | |
|     rns_region_size_type_idc | ue(v) |
| ... | |
|         wns_applicable_regions_idx[ i ][ j ] | u(v) |
| <insert>    wns_pixel_selector_flag[ i ][ j ] | u(1) |
|         if( wns_pixel_selector_flag[ i ][ j ] ) { | |
|             wns_selector_domain_id[ i ][ j ] | u(8) |
|             wns_selector_num_comps_minus1[ i ][ j ] | ue(v) |
|             for( k = 0; k <= wns_pixel_selector_num_comps_minus1[ i ][ j ]; k++ ) | |
|             { | |
|                 wns_selector_range_idc[ i ][ j ][ k ] | u(v) |
|                 for( m = 0; m < NumValsSelectorRange[ i ][ j ][ k ]; m++ ) | |
|                     wns_selector_range_val[ i ][ j ][ k ][ m ] | u(v) |
|                 wns_selector_range_outside_flag[ i ][ j ][ k ] | u(1) |
|             } | |
|         }<insertend> | |
|     while( !byte_aligned( )) | |
|         regional_nesting_zero_bit /* equal to 0 */ | u(1) |
| ... | | wns_pixel_selector_flag[i][j] equal to 1 specifies that a pixel selector is specified for the j-th applicable window of the i-th SEI message of syntax element set. wns_pixel_selector_flag[i][j] equal to 0 specifies a pixel selector is not specified for the j-th applicable window of the i-th SEI message of syntax element.

wns_selector_domain_id[i][j] specifies the domain in which pixel selector is defined for the j-th applicable window of the i-th SEI message of syntax element set. The value of wns_selector_domain_id[i][j] shall be in the range of 0 to 255 inclusive.

wns_selector_domain_id[i][j] equal to 0 specifies that the pixel selector is defined in the spatial domain and the pixel selector ranges are specified in pixel domain. wns_selector_domain_id[i][j] equal to 1 specifies that the pixel selector is defined in the YCbCr domain Values of wns_selector_domain_id[i][j] from 32 to 63 and from 128 to 255 may be used as determined by the application. Values of wns_selector_domain_id[i][j] from 3 to 31 and from 64 to 127 are reserved for future use by ITU-T ISO/IEC. Decoders encountering a value of wns_selector_domain_id[i][j] in the range of 3 to 31, inclusive, or in the range of 64 to 127, inclusive, shall ignore it.

wns_selector_num_comps_minus1[i][j] plus 1 specifies number of range specifiers defined for the j-th applicable window of the i-th SEI message of syntax element set. The value of wns_selector_num_comps_minus1[i][j] shall be in the range of 0 to 2, inclusive.

wns_selector_range_idc[i][j][k] specifies the interpretation of wns_selector_range_val[ ][ ][ ][ ] to derive the pixel selector. The value of wns_selector_range_idc[i][j][k] shall be in the range of 0 to 15, inclusive. The value of array NumValsSelectorRange[i][j][k] is derived as follows:

| Range type | wns_selector_range_idc[i][j][k] | NumValsSelectorRange[i][j][k] |
|---|---|---|
| Range | 0 | 2 |
| Circular disk | 1 | 3 |
| Elliptical | 2 | 6 | wns_selector_range_val[i][j][k][m] for m in the range of 0 to NumValsSelectorRange[i][j][k]−1, inclusive, is used to derive the pixel selector corresponding to the j-th applicable window.

wns_selector_range_outside_flag[i][j][k] equal to 1 specifies that the applicable region indicated by the k-th pixel selector for j-th applicable window is outside the region specified by the k-th pixel selector. wns_selector_range_outside_flag[i][j][k] equal to 0 specifies that the applicable region indicated by the k-th pixel selector for j-th applicable window is within the region specified by the k-th pixel selector.

Embodiment 6

This embodiment is similar to Embodiment 1, where for each applicable region, the region boundaries are specified based on offsets.

|  | Descriptor |
|---|---|
| regional_nesting( payloadSize ) { |  |
|   rns_id | u(32) |
|   rns_region_size_type_idc | ue(v) |
|   rns_num_rect_regions | ue(v) |
|   for( i = 0; i < rns_num_rect_regions; i++) { |  |
|     rns_rect_region_id[ i ] | u(32) |
| <insert>  rns_rect_region_left_offset[ i ] | u(16) |
|     rns_rect_region_top_offset[ i ] | u(16) |
|     rns_rect_region_right_offset[ i ] | u(16) |
|     rns_rect_region_bottom_offset[ i ] <insertend> | u(16) |
|   } |  |
|   num_seis_in_rns_minus1 | ue(v) |
|   while( !byte_aligned( ) ) |  |
|     regional_nesting_zero_bit /* equal to 0 */ | u(1) |
|   for( i = 0; i <= num_seis_in_rns_minus1; i++ ) { |  |
|     sei_message( ) |  |
|     rns_num_data_bytes[ i ] | u(8) |
|     for( j = 0; j < rns_num_data_bytes[ i ]; j++ ) |  |
|       rns_data_byte[ i ][ j ] | u(8) |
|   } |  |
| } |  | rns_region_size_type_idc specifies the units in which the boundaries of the regional are specified in the SEI message. When rns_region_size_type_idc is equal to 0, the syntax elements rns_region_left_offset[ ], rns_region_top_offset[ ], rns_region_right_offset[ ], and rns_region_bottom_offset[ ] are in units of samples. When rns_region_size_type_idc is equal to 1, the syntax elements rns_region_left_offset[ ], rns_region_top_offset[ ], rns_region_right_offset[ ], and rns_region_bottom_offset[ ] are in units of CTUs. When rns_region_size_type_idc is equal to 2, the syntax elements rns_region_left_offset[ ], rns_region_top_offset[ ], rns_region_right_offset[ ], and rns_region_bottom_offset[ ] are specified in units of tiles.

rns_rect_region_left_offset[i] specifies the horizontal offset of the top-left sample of the i-th rectangular region from the left picture boundary specified in the SEI message. The unit in which rns_rect_region_left_offset[i] is specified by the rns_region_size_type_idc syntax element.

rns_rect_region_top_offset[i] specifies the vertical offset of the top-left unit of the i-th rectangular region from the top picture boundary specified in the SEI message. The unit in which rns_rect_region_top_offset[i] is specified by the rns_region_size_type_idc syntax element.

rns_rect_region_right_offset[i] specifies the horizontal offset of the bottom-right unit of the i-th rectangular region from the right picture boundary specified in the SEI message. The unit in which rns_rect_region_right_offset[i] is specified by the rns_region_size_type_idc syntax element.

rns_rect_region_bottom_offset[i] specifies the vertical offset of the bottom-right unit of the i-th rectangular region from the bottom picture boundary specified in the SEI message. The unit in which rns_rect_region_bottom_offset[i] is specified by the rns_region_size_type_idc syntax element.

When rns_region_size_type_idc is equal to 0, the i-th rectangular region is defined as the region with horizontal coordinates starting from rns_region_left_offset[i] to pic_width_in_luma_samples−rns_region_right_offset[i]+1, and vertical coordinates from rns_region_top_offset[i], to pic_height_in_luma_samples rns_region_bottom_offset[i]+1.

When rns_region_size_type_idc is equal to 1, the i-th rectangular region is defined as the region with horizontal coordinates starting from CtbSizeY*rns_region_left_offset[i] to CtbSizeY*(PicWidthInCtbsY−rns_region_right_offset[i]+1)−1, and vertical coordinates from CtbSizeY*rns_region_top_offset[i] to CtbSizeY*(PicHeightInCtbsY−rns_region_bottom_offset[i]+1)−1

When rns_region_size_type_idc is equal to 2, the i-th rectangular region is defined as the region with horizontal coordinates starting from columnPosStartInLumaSamples[rns_region_left_offset[i]] to columnPosStartInLumaSamples[num_tile_columns_minus1 rns_region_right_offset[i]+1]−1, and vertical coordinates from rowPosStartInLumaSamples[rns_region_top_offset[i]] to rowPosStartInLumaSamples[num_tile_rows_minus1−rns_region_bottom_offset[i]+1]−1, where columnPosStartInLumaSamples[j] for j in the range of 0 to num_tile_columns_minus1+1, inclusive, and rowPosStartInLumaSamples[k] for k in the range of 0 to num_tile_rows_minus1+1, inclusive, are derived as follows:
  columnPosStartInLumaSamples[0]=ColumnWidthInLumaSamples[0]
  rowPosStartInLumaSamples[0]=RowHeightInLumaSamples[0]

for (j=1; j<=num_tile_columns_minus1; j++)
    columnPosStartInLumaSamples[j]=columnPosStartInLumaSamples[j−1]+ColumnWidthInLumaSamples[j]
for (k=1; k<=num_tile_rows_minus1; k++)
    rowPosStartInLumaSamples[k]=rowPosStartInLumaSamples[k−1]+RowHeightInLumaSamples[k]

In some alternatives, the syntax elements are signalled in units of a multiple of the sample positions. This multiple may be fixed (for example, the offsets may be specified in units of two sample positions) or based on other syntax elements in the bitstream or specified by other means. In some alternatives, negative offset values may also be signalled and the offset values are coded to allow positive or negative values.

In some alternatives, one or more of the syntax elements may not be signalled. When not signalled, the value may be inferred to a default value and the semantics associated with the default value may apply. For example, in some alternatives, the syntax element rns_region_size_type_idc may not be signalled and the units used to specify the boundaries of the regions is set to be sample positions (e.g. luma sample positions). Some of the methods described for the above alternatives or examples may be applicable not only for the semantics described in the embodiments, but may also apply to other values of the syntax elements used to describe the units of the sample positions.

In some alternatives, one or more of the syntax elements may signalled using fixed number of bits, and in other alternatives one or more syntax elements may be signalled using variable number of bits. For example, in this embodiment, one or more of the syntax elements rns_region_size_type_idc, rns_num_rect_regions, and num_seis_in_rns_minus1 may be signalled using fixed number of bits such as 8 bits, or one or more of the syntax elements rns_region_left_offset[ ], rns_region_top_offset[ ], rns_region_right_offset[ ], and rns_region_bottom_offset[ ] may be signalled using variable number of bits (for example using exponential Golomb codes). In one alternative, all the syntax elements in the regional nesting SEI message are signalled using fixed number of bits that may be a multiple of 8 and the byte alignment bits indicated by regional_nesting_zero_bit may not signalled. In some alternatives, only those syntax elements in the regional nesting SEI message that are not included within the nested SEI messages may be signalled using fixed number of bits, and the syntax elements inside the nested SEI messages may be signalled using fixed numbers or variable number of bits (for example, using exponential Golomb codes). The number of bits used to represent the syntax elements may be a fixed value or may be signalled in the bitstream or by other means.

Embodiment 7

In this embodiment, the syntax and semantics are similar to previous embodiments, and constraints are added so that the application of the SEI on the various regions is well defined.

The list listOfRegionNestableSEIMessages includes the following types of SEI messages:
  Tone mapping information SEI message with a particular value of tone_map_id
  Knee function information SEI message with a particular value of knee_function_id
  Color remapping information SEI message with a particular value of color_remap_id
  Film grain characteristics SEI message
  Post filter hint SEI message
  Chroma resampling filter hint SEI message When an SEI message of a particular type in listOfRegionNestableSEIMessages is present in one regional nesting SEI message and applies to a list of regions listA in the current picture and another SEI message of the same type in listOfRegionNestableSEIMessages is present in a regional nesting SEI message and applies to a list of regions listB in the current picture, it is a requirement of bitstream conformance that, for any pair or regions formed by choosing one from listA and the other from listB, the value of rns_rect_region_id[ ] of the two regions shall not be the same unless the two regions are identical and the two SEI messages are identical.

In some examples, the value of rns_rect_region_id[ ] of one region is not allowed to be equal to the rns_rect_region_id[ ] of any other region defined in the same regional nesting (RN) SEI message. In some examples, the value of rns_rect_region_id[ ] of any two regions in an RN SEI message are allowed to be the same as long as no two SEI messages of the same type belonging to listOfRegionNestableSEIMessages, one SEI applying to one region and the other SEI applying to the other region, apply to the same picture.

In some examples, listOfRegionNestableSEIMessages also include one or either of user data registered and user data unregistered SEI messages.

The techniques related to regional nesting messages described herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface.

The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 8:
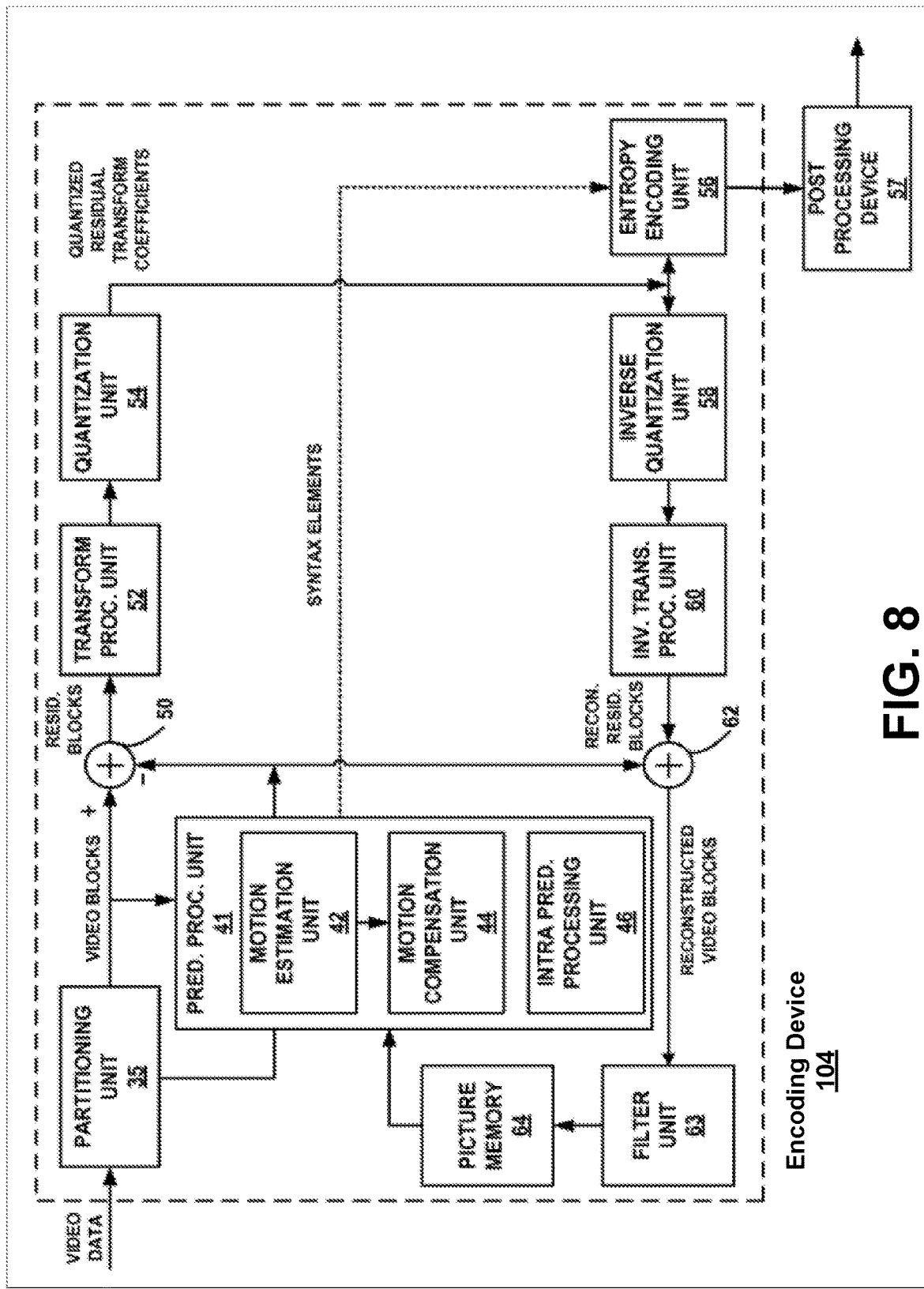
FIG. 8 is a block diagram illustrating an example video encoding device, in accordance with some examples.
Figure 9:
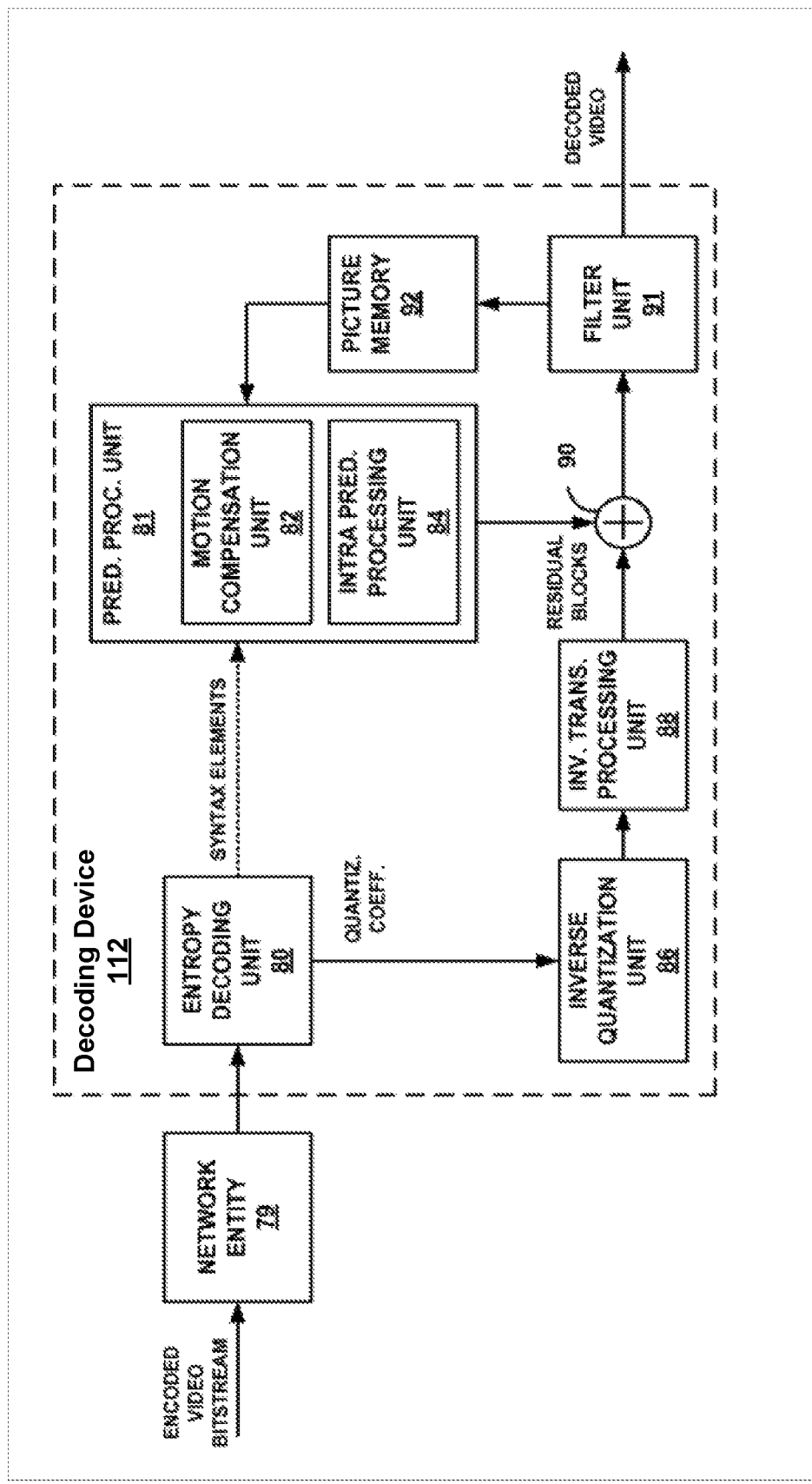
FIG. 9 is a block diagram illustrating an example video decoding device, in accordance with some examples.

Specific details of the encoding device 104 and the decoding device 112 are shown in FIG. 8 and FIG. 9, respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 8, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts.

The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 8 represents an example of a video encoder configured to generate syntax for a encoded video bitstream. The encoding device 104 may, for example, generate syntax for a regional nesting SEI message, as described above. The encoding device 104 may perform any of the techniques described herein, including the process described above with respect to FIG. 6. The techniques of this disclosure have generally been described with respect to the encoding device 104, but as mentioned above, some of the techniques of this disclosure may also be implemented by post processing device 57.

FIG. 9 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 8. The decoding device 112 may perform any of the techniques described herein, including the process described above with respect to FIG. 7.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or dequantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 9 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of decoding video data, the method comprising:
    receiving a video bitstream;
    obtaining information associated with a picture of the video bitstream, the information indicating an association between a number of functions and a number of regions of the picture;
    receiving, as part of the information, a first syntax element indicative of the number of regions of the picture, the number of regions including a first region of the picture and a second region of the picture, the first region and the second region being different from one another;
    receiving, as part of the information, a first region identifier value that identifies the first region of the picture and a second region identifier value that identifies the second region of the picture;
    receiving, as part of the information, a second syntax element indicative of the number of functions applicable to the number of regions, the number of functions including a first function associated with the first region and a second function associated with the second region;
    comparing the first region identifier value and the second region identifier value to each other; and
    determining, based on the comparison of the first region identifier value and the second region identifier value, whether to apply the first function or the second function to a sample of the picture.

2. The method of claim 1, wherein the information is included in a regional nesting message.

3. The method of claim 2, wherein the first function is part of a first nested message included in the regional nesting message, and wherein the second function is part of a second nested message included in the regional nesting message.

4. The method of claim 1, wherein the first function includes data specifying a characteristic for decoding the video bitstream associated with the first region or for post-processing decoded data for the first region based on the first region identifier value.

5. The method of claim 1, wherein region data defining the first region of the picture is included once in the obtained information.

6. The method of claim 1, wherein the first function includes data associated with the first region identifier value indicating that the first region is associated with the data.

7. The method of claim 1, wherein the first region identifier value and the second region identifier value are associated with the first function indicating that the first function is independently applicable to each of the first region and the second region.

8. The method of claim 1, wherein the second function includes data associated with the first region identifier value indicating that the first region is associated with the data.

9. The method of claim 1, further comprising obtaining, from the information associated with the picture, region data at least one of defining one or more boundaries of the first region and defining samples contained in the first region.

10. The method of claim 1, further comprising obtaining, from the information associated with the picture, region data defining one or more offsets of one or more boundaries of the first region from one or more boundaries of the picture.

11. The method of claim 1, further comprising obtaining, from the information associated with the picture, region data defining the first region as a rectangular region.

12. The method of claim 1, further comprising obtaining, from the information associated with the picture, a set of indices for the first function, the set of indices indicating one or more regions for which a set of data associated with the first function is to be applied.

13. The method of claim 1, further comprising:
    determining that the sample of the picture is included within the first region and the second region of the picture; and
    based on the first region identifier value, the second region identifier value, and the sample of the picture being included within the first region and the second region of the picture, determining whether to apply the first function or the second function to the sample of the picture.

14. The method of claim 13, further comprising:
    determining the first region identifier value is greater than the second region identifier value; and
    based on the first region identifier value being greater than the second region identifier value, determining to apply the first function to the sample and determining not to apply the second function to the sample.

15. The method of claim 1, further comprising:
    decoding the picture; and
    applying the first function to the sample.

16. An apparatus comprising:
    a receiver configured to receive a video bitstream;
    a memory configured to store video data of the video bitstream; and
    a processor implemented in circuitry and configured to:
        obtain information associated with a picture of the video bitstream, the information indicating an association between a number of functions and a number of regions of the picture;
        receive, as part of the information, a first syntax element indicative of the number of regions of the picture, the number of regions including a first region of the picture and a second region of the picture, the first region and the second region being different from one another;
        receive, as part of the information, a first region identifier value that identifies the first region of the picture and a second region identifier value that identifies the second region of the picture;
        receive, as part of the information, a second syntax element indicative of the number of functions applicable to the number of regions, the number of functions including a first function associated with the first region and a second function associated with the second region;
        compare the first region identifier value and the second region identifier value to each other; and determine, based on the comparison of the first region identifier value and the second region identifier value, whether to apply the first function or the second function to a sample of the picture.

17. The apparatus of claim 16, wherein the information is included in a regional nesting message.

18. The apparatus of claim 17, wherein the first function is part of a first nested message included in the regional nesting message, and wherein the second function is part of a second nested message included in the regional nesting message.

19. The apparatus of claim 16, wherein the first function includes data specifying a characteristic for decoding the video bitstream associated with the first region or for post-processing decoded data for the first region based on the first region identifier value.

20. The apparatus of claim 16, wherein region data defining the first region of the picture is included once in the obtained information.

21. The apparatus of claim 16, wherein the first function includes data associated with the first region identifier value indicating that the first region is associated with the data.

22. The apparatus of claim 16, wherein the first region identifier value and the second region identifier value are associated with the first function indicating that the first function is independently applicable to each of the first region and the second region.

23. The apparatus of claim 16, wherein the second function includes data associated with the first region identifier value indicating that the first region is associated with the data.

24. The apparatus of claim 16, wherein the processor is configured to obtain, from the information associated with the picture, region data at least one of defining one or more boundaries of the first region and defining samples contained in the first region.

25. The apparatus of claim 16, wherein the processor is configured to obtain, from the information associated with the picture, region data defining one or more offsets of one or more boundaries of the first region from one or more boundaries of the picture.

26. The apparatus of claim 16, wherein the processor is configured to obtain, from the information associated with the picture, region data defining the first region as a rectangular region.

27. The apparatus of claim 16, wherein the processor is configured to obtain, from the information associated with the picture, a set of indices for the first function, the set of indices indicating one or more regions for which a set of data associated with the first function is to be applied.

28. The apparatus of claim 16, wherein the processor is configured to:
determine that the sample of the picture is included within the first region and the second region of the picture; and
based on the first region identifier value, the second region identifier value, and the sample of the picture being included within the first region and the second region of the picture, determine whether to apply the first function or the second function to the sample of the picture.

29. The apparatus of claim 28, wherein the processor is configured to:
determine the first region identifier value is greater than the second region identifier value; and
based on the first region identifier value being greater than the second region identifier value, determine to apply the first function to the sample and determining not to apply the second function to the sample.

30. The apparatus of claim 16, wherein the processor is configured to:
decode the picture; and
apply the first function to the sample.

31. The apparatus of claim 16, wherein the apparatus comprises a mobile device with a camera for capturing pictures.

* * * * *